(12) United States Patent
Tan et al.

(10) Patent No.: US 8,782,526 B2
(45) Date of Patent: Jul. 15, 2014

(54) METHOD AND DEVICE FOR PROCESSING NETWORK ELEMENT OBJECT INFORMATION IN 3D TOPOLOGY VIEW

(71) Applicant: Huawei Technologies Co., Ltd., Shenzhen (CN)

(72) Inventors: Yanfang Tan, Shenzhen (CN); Jianbo Liang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/850,627

(22) Filed: Mar. 26, 2013

(65) Prior Publication Data

US 2013/0246924 A1 Sep. 19, 2013

Related U.S. Application Data

(63) Continuation of application No. PCT/CN2012/083664, filed on Oct. 29, 2012.

(30) Foreign Application Priority Data

Mar. 19, 2012 (CN) .......................... 2012 1 0072759

(51) Int. Cl.
*G06F 15/177* (2006.01)
*G06F 3/00* (2006.01)
*G06F 3/048* (2013.01)

(52) U.S. Cl.
USPC ............ 715/736; 715/734; 715/738; 715/800

(58) Field of Classification Search
None
See application file for complete search history.

(56) References Cited

U.S. PATENT DOCUMENTS 7,698,647 B2 * 4/2010 Steeb et al. ................... 715/738
8,443,287 B2 * 5/2013 Gooding et al. .............. 715/736
(Continued)

FOREIGN PATENT DOCUMENTS

CN 101060537 A 10/2007
CN 101217410 A 7/2008
(Continued)

OTHER PUBLICATIONS

Foreign Communication From A Counterpart Application, Chinese Application No. 201210072759.1, Chinese Search Report dated Mar. 21, 2014, 8 pages.

(Continued)

*Primary Examiner* — Stephen Alvesteffer
(74) *Attorney, Agent, or Firm* — Conley Rose, P.C.; Grant Rodolph; Nicholas K. Beaulieu

(57) ABSTRACT

A method and a device for processing network element object information in a three-dimensional (3D) topology view are provided. The method includes: in response to a user's operation of selecting a first network element object in the 3D topology view displayed in a window, sending a first instruction to a back-end server; receiving position coordinates and size information of the first network element object from the back-end server; and adjusting position coordinates of the first network element object in the window according to a size of the window and the position coordinates of the first network element object, multiplying the size information of the first network element object by a preset zoom factor to zoom the first network element object, and redisplaying the zoomed first network element object at the adjusted position coordinates in the window. Thus the user can identify the network element object quickly in the window.

22 Claims, 13 Drawing Sheets

(56) References Cited

U.S. PATENT DOCUMENTS

| | | |
|---|---|---|
| 2001/0042118 A1 | 11/2001 | Miyake et al. |
| 2002/0135610 A1* | 9/2002 | Ootani et al. .................. 345/734 |
| 2005/0223092 A1 | 10/2005 | Sapiro et al. |
| 2007/0016592 A1 | 1/2007 | Ferla et al. |
| 2007/0206512 A1 | 9/2007 | Hinds et al. |
| 2010/0110932 A1 | 5/2010 | Doran et al. |

FOREIGN PATENT DOCUMENTS

| | | |
|---|---|---|
| CN | 101223524 A | 7/2008 |
| CN | 102014403 A | 4/2011 |
| CN | 102136946 A | 7/2011 |
| CN | 102638455 A | 8/2012 |
| WO | 0075788 A1 | 12/2000 |
| WO | 0227564 A1 | 4/2002 |
| WO | 2011056218 A2 | 5/2011 |

OTHER PUBLICATIONS

Foreign Communication From A Counterpart Application, European Application No. 12826658.2, Extended European Search Report dated May 9, 2014, 8 pages.

* cited by examiner

METHOD AND DEVICE FOR PROCESSING NETWORK ELEMENT OBJECT INFORMATION IN 3D TOPOLOGY VIEW

CROSS-REFERENCE TO RELATED APPLICATIONS

This application is a continuation of International Application No. PCT/CN2012/083664, filed on Oct. 29, 2012, which claims priority to Chinese Patent Application No. 201210072759.1, filed on Mar. 19, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to network management technologies, and in particular, to a method and a device for processing network element object information in a three-dimensional (3D) topology view.

BACKGROUND

In telecommunications operation and maintenance, a topology view is an effective tool for an operator to perform operation and maintenance, and can help operation and maintenance personnel display networking of network devices (that is, network element objects) visually.

With the continuous increase of mobile traffic, the number of network element objects to be managed is soaring, and the network structure is more and more complicated. To facilitate management of network element objects, subnets are created at a data model layer according to dimensions such as an area dimension, and all types of network element objects in the same area are placed into the corresponding subnet. At a topology view layer, all network element objects in the same subnet are displayed on the same plane.

Because the number of network element objects is large, the practice of displaying all network element objects in one subnet on the same plane makes it inconvenient for the operation and maintenance personnel to identify a network element object quickly.

SUMMARY

The present invention provides a method and a device for processing network element object information in a 3D topology view, so as to solve, to some extent, a problem that operation and maintenance personnel are unable to identify a network element object quickly through a topology view in the prior art.

In one aspect, an embodiment of the present invention provides a method for processing network element object information in a 3D topology view, including: in response to a user's operation of selecting a first network element object in a 3D topology view displayed in a window, sending a first instruction to a back-end server of a network management system, where the first instruction contains an identifier of the first network element object and a zoom viewing operation command; receiving position coordinates and size information of the first network element object from the back-end server of the network management system, where the size information of the first network element object includes a length, a width, and a height of the first network element object, the position coordinates and the size information of the first network element object are obtained by the back-end server of the network management system from stored network element object information according to the zoom viewing operation command and the identifier of the first network element object, and the network element object information includes an identifier, position coordinates, and size information of each network element object in the 3D topology view; and adjusting the position coordinates of the first network element object in the window according to a size of the window and the position coordinates of the first network element object, multiplying the size information of the first network element object by a preset zoom factor to zoom the first network element object, and redisplaying the first network element object, on which zooming is performed, at the adjusted position coordinates in the window.

In one aspect, an embodiment of the present invention provides a front-end client of a network management system, including: a user event responding module configured to, in response to a user's operation of selecting a first network element object in a 3D topology view displayed in a window, send a first instruction to a back-end server of the network management system, where the first instruction contains an identifier of the first network element object and a zoom viewing operation command; an information receiving module configured to receive position coordinates and size information of the first network element object from the back-end server of the network management system, where the size information of the first network element object includes a length, a width, and a height of the first network element object, the position coordinates and the size information of the first network element object are obtained by the back-end server of the network management system from stored network element object information according to the zoom viewing operation command and the identifier of the first network element object, and the network element object information includes an identifier, position coordinates, and size information of each network element object in the 3D topology view; and a topology displaying module configured to adjust the position coordinates of the first network element object in the window according to a size of the window and the position coordinates of the first network element object, multiply the size information of the first network element object by a preset zoom factor to zoom the first network element object, and redisplay the zoomed first network element object at the adjusted position coordinates in the window.

In another aspect, an embodiment of the present invention provides a method for processing network element object information in a 3D topology view, including: receiving a first instruction sent by a front-end client of a network management system, where the first instruction is generated by the front-end client of the network management system in response to a user's operation of selecting a first network element object in a 3D topology view displayed in a window, and the first instruction contains an identifier of the first network element object and a zoom viewing operation command; obtaining position coordinates and size information of the first network element object from stored network element object information according to the zoom viewing operation command and the identifier of the first network element object, where the size information of the first network element object includes a length, a width, and a height of the first network element object, and the network element object information includes an identifier, position coordinates, and size information of each network element object in the 3D topology view; and transmitting the position coordinates and the size information of the first network element object to the front-end client of the network management system so that the front-end client of the network management system redisplays the first network element object, on which zooming is performed, at adjusted position coordinates in the window.

In another aspect, an embodiment of the present invention provides a back-end server of a network management system, including: an instruction receiving module configured to receive a first instruction sent by a front-end client of the network management system, where the first instruction is generated by the front-end client of the network management system in response to a user's operation of selecting a first network element object in a 3D topology view displayed in a window, and the first instruction contains an identifier of the first network element object and a zoom viewing operation command; an information obtaining module configured to obtain position coordinates and size information of the first network element object from stored network element object information according to the zoom viewing operation command and the identifier of the first network element object, where the size information of the first network element object includes a length, a width, and a height of the first network element object, and the network element object information includes an identifier, position coordinates, and size information of each network element object in the 3D topology view; and an information transmitting module configured to transmit the position coordinates and the size information of the first network element object to the front-end client of the network management system so that the front-end client of the network management system redisplays the first network element object, on which zooming is performed, at adjusted position coordinates in the window.

With the method for processing network element object information in a 3D topology view and the front-end client of the network management system in one aspect of an embodiment of the present invention, a response is made to a user's operation of selecting a network element object in the 3D topology view displayed in a window, and an instruction is sent to a back-end server of the network management system, and therefore, the back-end server of the network management system obtains position coordinates and size information of the selected network element object according to an identifier of the selected network element and a zoom viewing operation command in the instruction, and provides the obtained information to the front-end client of the network management system; the front-end client of the network management system readjusts a display position of the selected network element object in the window, and zooms the selected network element object, thereby achieving the effect of moving the display position of the selected network element object in the window and zooming the selected network element object, enabling the operation and maintenance personnel to identify the selected network element object quickly in the window, and solving the problem that the operation and maintenance personnel are unable to identify a network element object quickly when all network element objects in the same subnet are displayed on the same plane in the prior art.

With the method for processing network element object information in a 3D topology view and the back-end server of the network management system in another aspect of an embodiment of the present invention, through collaboration with a front-end client of the network management system, position coordinates and size information of a selected network element object are obtained according to a first instruction of the front-end client of the network management system and provided for the front-end client of the network management system; the front-end client of the network management system readjusts a display position of the selected network element object in the window, and zooms the selected network element object, thereby achieving the effect of moving the display position of the selected network element object in the window and zooming the selected network element object, and enabling the operation and maintenance personnel to identify the selected network element object quickly in the window.

BRIEF DESCRIPTION OF THE DRAWINGS

To describe the technical solutions in the embodiments of the present invention or in the prior art more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more clear, the following clearly describes the technical solutions in the embodiments of the present invention with reference to the accompanying drawings in the embodiments of the present invention. The embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1A:
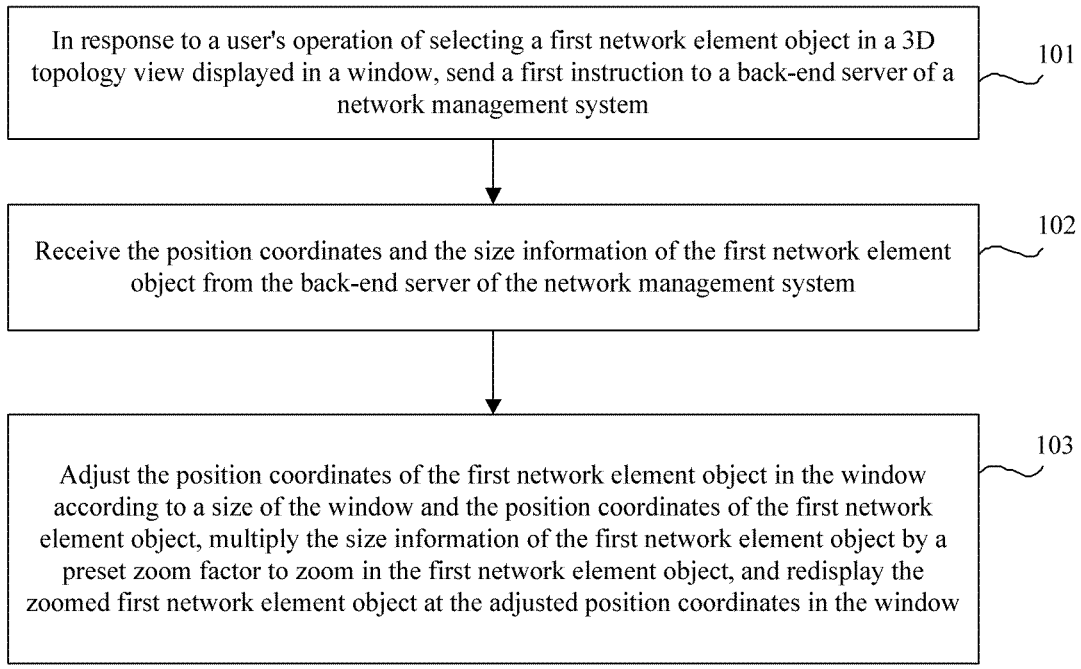
FIG. 1A is a flowchart of a method for processing network element object information in a 3D topology view according to a first embodiment of the present invention.

FIG. 1A is a flowchart of a method for processing network element object information in a 3D topology view according to a first embodiment of the present invention. As shown in FIG. 1A, the method in the embodiment includes:

Step 101: In response to a user's operation of selecting a first network element object in a 3D topology view displayed in a window, send a first instruction to a back-end server of a network management system.

The first instruction contains an identifier of the first network element object and a zoom viewing operation command.

It needs to be explained that a network element object in the embodiment of the present invention represents a network element displayed in the window. For example, the network element object may be an icon. A connection object in the embodiment of the present invention represents a connection relationship between network elements displayed in the window. For example, the connection object may be a connection line, network elements at two ends of the connection line, or the like.

The entity for performing the embodiment is a front-end client of the network management system in a network management system, and may be one of various devices that have a high computing capability and support topology view display, for example, a personal computer, a smart mobile terminal, a tablet computer, and so on.

Figure 1B:
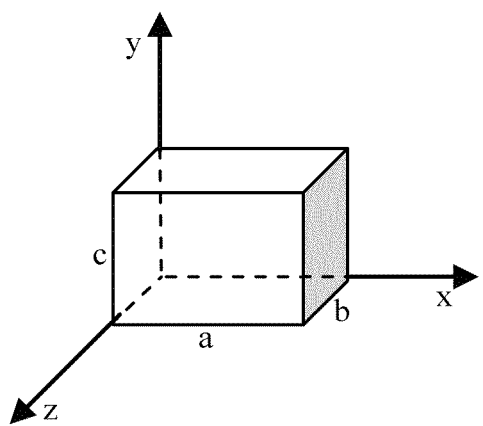
FIG. 1B is a schematic structural diagram of a network element object displayed in a window according to the first embodiment of the present invention.

In the embodiment, information about each network element object is pre-stored on the back-end server of the network management system in the network management system, or on a storage system (such as a storage array or a database) communicatively connected to the back-end server of the network management system. For example, the information may be: name, identifier, position coordinate, and size information of each network element object; displayed color of each network element object; existing connection relationship, and so on. The topology view is a 3-dimensional view. Therefore, in the embodiment, position coordinates of each network element object may be expressed by 3-dimensional coordinates (x, y, z) of each vertex of the network element object, as shown in FIG. 1B. The cube in FIG. 1B represents a network element object. In addition, each network element object has its size, which may be expressed by a length, a width, and a height, that is, (a, b, c).

Alternatively, the foregoing information of the network element object may be categorized into two types. One type is information of a network element object, and the other type is information of a connection object. Information of a network element object mainly includes an identifier, a display status, position coordinates (x, y, z), size information (a, b, c) of the network element object. The display status of the network element object includes the following: the network element object is currently displayed in the window, and the network element object is not displayed in the window. In each embodiment of the present invention, the information about all network element objects in the entire 3D topology view is called network element object information. That is, the network element object information includes an identifier, a display status, position coordinates, size information of each network element object in the 3D topology view. A connection relationship between two network element objects that are connected with each other is called a connection object, and the two network element objects are network element objects located at two ends of the connection object. Information about each connection object mainly includes identifiers of network element objects at two ends of the connection object. In addition, the information about each connection object may further include a connection distance between network element objects at two ends, and a connection angle. In each embodiment of the present invention, the information about all connection objects in the entire 3D topology view is called connection object information. That is, the connection object information includes identifiers of network element objects at two ends of each connection in the 3D topology view, a connection distance between the network element objects at two ends, a connection angle.

Similar to the prior art, the front-end client of the network management system in the embodiment also classifies all network element objects in a network into subnets based on areas, and displays all network element objects in the same subnet on the same plane. In the embodiment, the plane refers to a window.

In addition, the front-end client of the network management system in the embodiment is primarily oriented to users, and is used to respond to a user's operation for each network element object in the 3D topology view displayed in the window. For example, the front-end client of the network management system in the embodiment primarily provides the following functions for each network element object in the 3D topology view displayed in the window: selecting a network element object, viewing a connection relationship of network element objects, creating a Synchronous Digital Hierarchy (SDH) path, and so on. When a user needs to view or identify a network element object, the user may perform an operation of selecting a network element object in the window by clicking the network element object through a mouse or tapping the network element object through a finger, or by selecting the network element object through a right-click. The front-end client of the network management system in the embodiment can, in response to the user's operation of selecting a network element object, identify which network element object is selected by the user. For example, the user clicks a network element object through a mouse, and then, from the click operation, the front-end client of the network management system identifies which network element object is selected and acquires information such as an identifier of the selected network element object.

In the embodiment, after in response to the user's operation of selecting a network element object, the front-end client of the network management system generates an instruction, where the instruction contains the identifier of the network element object selected by the user and a zoom viewing operation command, and then sends the instruction to the back-end server of the network management system. In this way, according to the zoom viewing operation command and the identifier of the network element object selected by the user, the back-end server of the network management system can obtain, from pre-stored network element object information, information required for zooming the network element object selected by the user, and return the obtained information to the front-end client of the network management system, so as to zoom the network element object selected by the user.

The information required for zooming the network element object selected by the user mainly includes position coordinates and size information of the network element object selected by the user.

In the embodiment, an example that the user selects a first network element object in a 3D topology view displayed in a window of the front-end client of the network management system, and an instruction sent to the back-end server of the network management system is a first instruction is taken for illustration. It should be noted that the processing for any other network element objects is the same as the processing for the first network element object, and is not repeated herein.

The user may select the first network element object through various operations identifiable by the front-end client of the network management system, for example, by clicking on the first network element object, or by right-clicking on the first network element object and selecting an option of selecting the network element object, and so on. In response to the user's operation of selecting the first network element object, the front-end client of the network management system generates a first instruction, and sends the first instruction to the back-end server of the network management system. The first instruction contains an identifier of the first network element object and a zoom viewing operation command.

After receiving the first instruction, the back-end server of the network management system parses the first instruction to obtain the identifier of the first network element object and the zoom viewing operation command. Afterward, the back-end server of the network management system obtains position coordinates and size information of the first network element object from pre-stored network element object information according to the zoom viewing operation command and the identifier of the first network element object, and transmits the position coordinates and the size information of the first network element object to the front-end client of the network management system.

Further, the network element object information may further include a display status of each network element object in the 3D topology view.

Alternatively, according to the zoom viewing operation command and the display status of each network element object in the network element object information, the back-end server of the network management system may obtain, from the network element object information, position coordinates and size information of each network element object currently displayed in the window of the front-end client of the network management system. Because the first network element object is displayed in the window, it is one of the network element objects currently displayed in the window. That is, the network element objects currently displayed in the window include the first network element object. In this case, according to the identifier information of the first network element object, the back-end server of the network management system may further obtain the position coordinates and the size information of the first network element object from the obtained position coordinates and size information of all the network element objects currently displayed in the window.

Alternatively, the back-end server of the network management system may transmit the position coordinates and the size information of other network element objects currently displayed in the window along with the position coordinates and the size information of the first network element object to the front-end client of the network management system.

Alternatively, the back-end server of the network management system may send the obtained position coordinates and size information of all the network element objects currently displayed in the window to the front-end client of the network management system simultaneously, without the need of obtaining the position coordinates and the size information of the first network element object separately from the information.

Step 102: Receive the position coordinates and the size information of the first network element object from the back-end server of the network management system.

The size information of the first network element object includes a length, a width, and a height of the first network element object. The position coordinates and the size information of the first network element object are obtained by the back-end server of the network management system from stored network element object information according to the zoom viewing operation command and the identifier of the first network element object, and then returned to the front-end client of the network management system.

The network element object information includes an identifier, position coordinates, and size information of each network element object in the 3D topology view. Therefore, the back-end server of the network management system can obtain the position coordinates and the size information of the first network element object according to the identifier of the first network element object.

After sending the first instruction to the back-end server of the network management system, the front-end client of the network management system receives the position coordinates and size information of the first network element object that are returned by the back-end server of the network management system.

Alternatively, if the information transmitted by the back-end server of the network management system to the front-end client of the network management system is the obtained position coordinates and size information of all the network element objects currently displayed in the window, the front-end client of the network management system may receive the position coordinates and the size information of all the network element objects (including the first network element object) currently displayed in the window.

Step 103: Adjust the position coordinates of the first network element object in the window according to a size of the window and the position coordinates of the first network element object, multiply the size information of the first network element object by a preset zoom factor to zoom the first network element object, and redisplay the zoomed first network element object at the adjusted position coordinates in the window.

Specifically, after obtaining the position coordinates of the first network element object, the front-end client of the network management system in the embodiment may recalculate the position coordinates of the first network element object according to the size of the window and the current display position of the first network element object in the window, and therefore, can adjust the display position of the first network element object in the window.

Further, to enable the user to identify the first network element object quickly, the front-end client of the network management system in the embodiment may multiply the size information of the first network element object by a preset zoom factor to zoom the first network element object. The zoom factor is preset, for example, may be set to 2, which is not limited thereto.

After the display position of the first network element object in the window is adjusted and the first network element object is zoomed, the front-end client of the network management system redisplays the zoomed first network element object in the adjusted position in the window.

In the embodiment, to view or identify a network element object, the user only needs to perform an operation of selecting the network element object. In response to the user's operation of selecting the network element object, the front-end client of the network management system sends an instruction to the back-end server of the network management system to obtain the position coordinates and the size information of the network element object from the back-end server of the network management system, and adjusts the display position of the network element object and zooms the network element object according to the obtained information and the size of the window. In this way, the network element object can be highlighted in the window, and the user can identify the network element object quickly among many network element objects in the window.

Figure 1C:
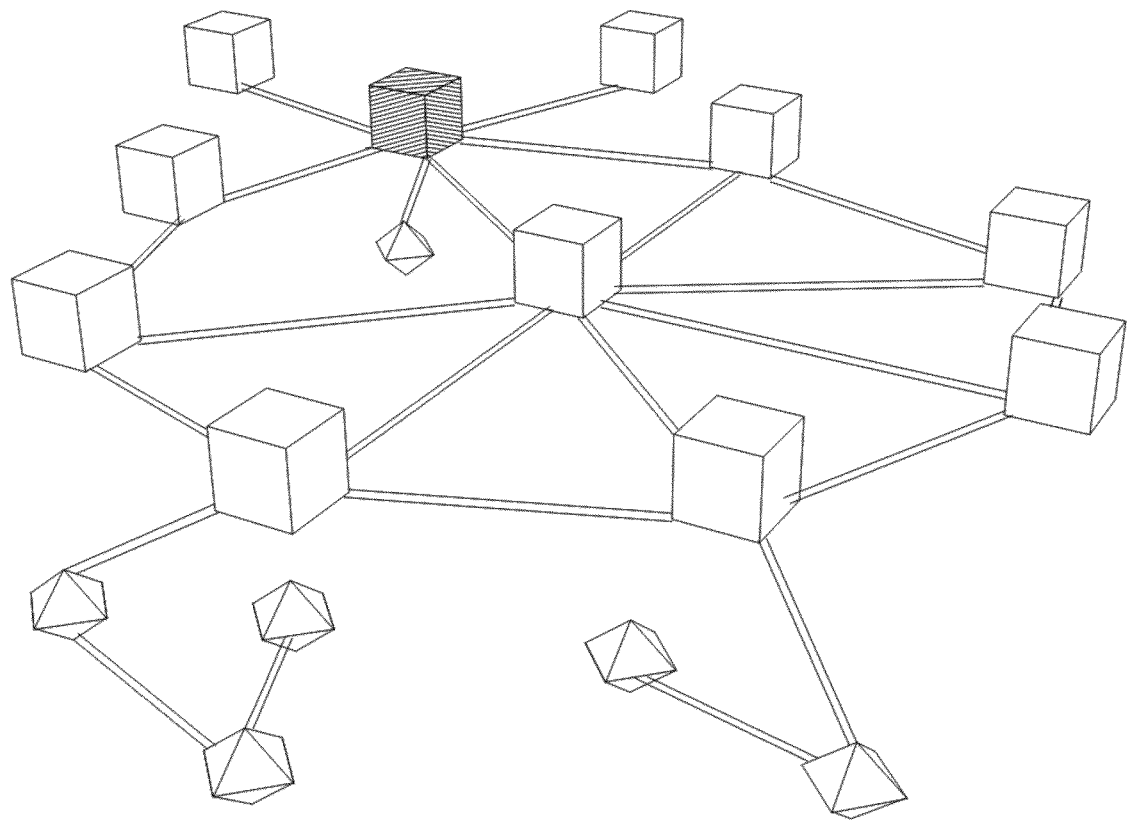
FIG. 1C is a display status of a window according to the first embodiment of the present invention.

Alternatively, the specific implementation manner of "if the information received by the front-end client of the network management system is the position coordinates and the size information of all the network element objects currently displayed in the window from the back-end server of the network management system, the front-end client of the network management system adjusts the display position of the first network element object in the window according to the size of the window and the position coordinates of the first network element object, multiplies the size information of the first network element object by a preset zoom factor to zoom the first network element object, and redisplays the first network element object in the window" may be:

According to the position coordinates of each network element object currently displayed in the window, the front-end client of the network management system calculates a distance between the first network element object and network element objects other than the first network element object among all the network element objects currently displayed in the window. Assuming that the position coordinates of the first network element object are $(x_a, y_a, z_a)$ and that the position coordinates of a specific network element object among other network element objects are $(x_b, y_b, z_b)$, the distance between the first network element object and the specific network element object is $D=\sqrt{(x_a-x_b)^2+(y_a-y_b)^2+(z_a-z_b)^2}$. In the embodiment, FIG. 1C shows a display status of the current window, in which a shaded cube represents the first network element object. Position relationships and distances between the first network element object and network element objects represented by other cubes or polyhedrons are shown in FIG. 1C.

Afterward, the front-end client of the network management system recalculates the position coordinates of the first network element object as coordinates that corresponds to a central position of the window, and multiplies each of the length, the width, and the height in the size information of the first network element object by a zoom factor. In this way, the display position of the first network element object may be adjusted to the central position of the window, which helps the user identify the first network element object. Multiplying each of the length, the width, and the height of the first network element object by the zoom factor not only ensures that the first network element object does not deform, but also ensures that the first network element object is better zoomed. For example, if the zoom factor is 2, after each of the length, the width, and the height is multiplied by 2, the first network element object is magnified 8 times, which helps the user identify the first network element object.

Subsequently, according to the recalculated position coordinates of the first network element object and the distance between the first network element object and network element objects other than the first network element object among all the network element objects currently displayed in the window, the front-end client of the network management system recalculates the position coordinates of network element objects other than the first network element object among all the network element objects currently displayed in the window. In this process, the size information of other network element objects in the window remains unchanged. In this way, it is ensured that the distance between the first network element object and other network element objects in the window is unchanged, and the authenticity of other network element objects may be maintained as far as possible.

Finally, according to the recalculated position coordinates of all the network element objects (including the first network element object) currently displayed in the window, the size information of the first network element object on which zooming is performed, and the received size information of network element objects other than the first network element object among all the network element objects currently displayed in the window, the front-end client of the network management system redisplays all the network element objects currently displayed in the window.

Figure 1D:
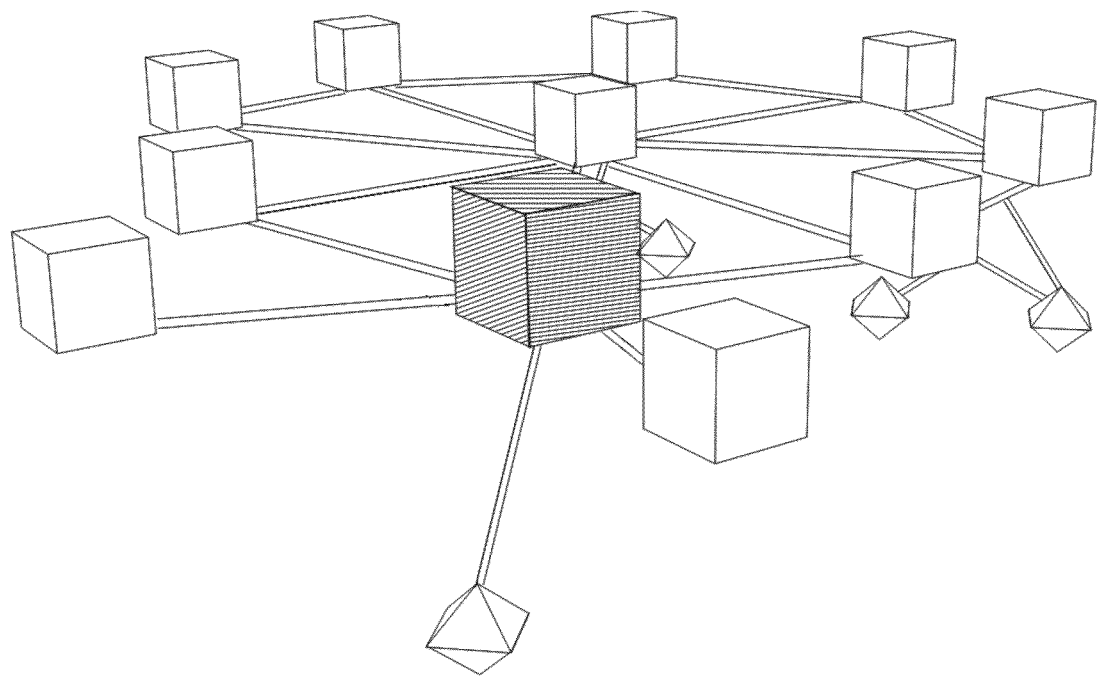
FIG. 1D is another display status of a window according to the first embodiment of the present invention.

After the foregoing processing, the display status in the window shown in FIG. 1C changes to what is shown in FIG. 1D. By comparison between FIG. 1C and FIG. 1D, it is evident that the first network element object is zoomed and displayed in a central position of the window. The position relationships between the first network element object and other network element objects are shown in FIG. 1D, and are not detailed herein any further.

In the above implementation manner, the front-end client of the network management system adjusts the position coordinates of the first network element object and zooms the first network element object to highlight the first network element object, thereby solving the problem that the user is unable to identify the network element object quickly when all network element objects in the same subnet are displayed on the same plane in the prior art; moreover, by ensuring no change of the distance between the first network element object and other network element objects and no change of the sizes of other network element objects, the authenticity of the topology that is redisplayed is maximally ensured.

Figure 2:
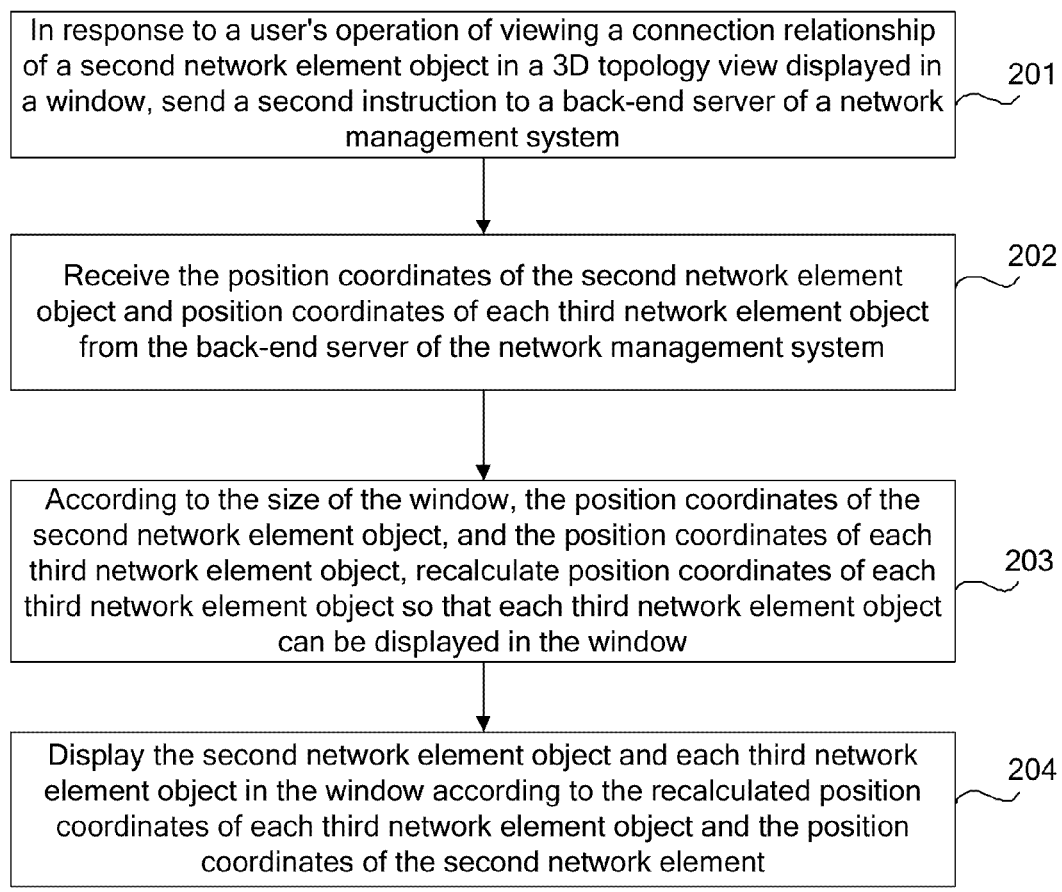
FIG. 2 is a flowchart of a method for processing network element object information in a 3D topology view according to a second embodiment of the present invention.

FIG. 2 is a flowchart of a method for processing network element object information in a 3D topology view according to a second embodiment of the present invention. As shown in FIG. 2, the method in the embodiment includes:

Step 201: In response to a user's operation of viewing a connection relationship of a second network element object in a 3D topology view displayed in a window, send a second instruction to a back-end server of a network management system.

The second instruction contains an identifier of the second network element object and a connection relationship viewing operation command. The connection relationship of the second network element object includes the second network element object and all third network element objects, where the third network element objects are network element objects connected to the second network element object.

In the embodiment, the connection relationship of a network element object mainly includes the network element object and other network element objects that are connected to the network element object. More specifically, the connection relationship of a network element object mainly includes an identifier of the network element object, identifiers of other network element objects that are connected to the network element object, and connection information about connections between the network element object and other network element objects. In the description of the embodiment, the second network element object is taken as an example, and the connection relationship of the second network element object mainly includes the second network element object and all network element objects that are connected to the second network element object. To simplify the description in the embodiment, the network element objects connected to the second network element object are called third network element objects. In addition, a connection between each third network element object and the second network element object is also regarded as information in the connection relationship.

The entity for performing the embodiment is also a front-end client of a network management system, and the front-end client of the network management system collaborates with a back-end server of the network management system.

Similar to the prior art, the front-end client of the network management system in the embodiment also classifies all network element objects in the network into subnets based on areas, and displays all network element objects in the same subnet on the same plane. In the embodiment, the same plane is called a window.

In the embodiment, the back-end server of the network management system also pre-stores network element object information and connection object information. For description of the network element object information and the connection object information, reference may be made to step 101, and no repeated description is given herein.

In addition, the front-end client of the network management system in the embodiment also provides the following functions for each network element object displayed in the window: selecting a network element object, viewing a connection relationship of a network element object, creating an SDH path, and so on. When a user needs to view a connection relationship of a network element object, the user may perform an operation of viewing the connection relationship of the network element object by right-clicking and selecting a function option of viewing the connection relationship of the network element object. However, the manner of performing an operation of viewing a connection relationship of a network element object is not limited thereto. In the embodiment, in response to the user's operation of viewing a connection relationship of a network element object, the front-end client of the network management system obtains information such as an identifier of the network element object whose connection relationship is to be viewed by the user, and then generates an instruction, where the instruction contains a connection relationship viewing operation command and the identifier of the network element object whose connection relationship is to be viewed by the user, and then the instruction is sent to the back-end server of the network management system. In this way, according to the identifier of the network element object and the connection relationship viewing operation command, the back-end server of the network management system can obtain information required for viewing the connection relationship, and transmit the obtained information to the front-end client of the network management system.

The information required for viewing the connection relationship mainly includes all network element objects that are connected to the network element object whose connection relationship is to be viewed, and connections between the network element object and the network element objects that are connected to the network element object.

In the embodiment, it is assumed that the connection relationship of a second network element object in a 3D topology view displayed in a window is to be viewed, and that an instruction sent to the back-end server of the network management system is a second instruction. However, the operation for viewing the connection relationship of any network element object is the same as that for the second network element object, and is not repeated herein.

A user may perform an operation of viewing the connection relationship of the second network element object, by selecting an option of viewing the connection relationship of the second network element object. In the embodiment, in response to the user's operation of viewing the connection relationship of the second network element object, the front-end client of the network management system obtains an identifier of the second network element object, generates a second instruction, and sends the second instruction to the back-end server of the network management system. The second instruction contains an identifier of the second network element object and a connection relationship viewing operation command.

After receiving the second instruction, the back-end server of the network management system parses the second instruction to obtain the identifier of the second network element object and the connection relationship viewing operation command. Afterward, according to the connection relationship viewing operation command and the identifier of the second network element object, the back-end server of the network management system identifies that the user intends to view the connection relationship of the second network element object, and, according to the identifier of the second network element object, queries pre-stored connection object information to obtain identifiers of all third network element objects connected to the second network element object. Subsequently, according to the identifier of the second network element object and an identifier of each third network element object, the back-end server of the network management system queries pre-stored network element object information to obtain position coordinates of the second network element object and position coordinates of each third network element object. It should be noted that the back-end server of the network management system not only can obtain the position coordinates of the second network element object and position coordinates of each third network element object, but also can obtain other information, such as size information, a display status, of the second network element object and each third network element object. In the embodiment, information of position coordinates is primarily required, and therefore, that the position coordinates of the second network element object and position coordinates of each third network element object are obtained is taken as an example. Afterward, the back-end server of the network management system transmits the obtained position coordinates of the second network element object and the obtained position coordinates of each third network element object to the front-end client of the network management system.

It should be noted that the connection relationship viewing operation command contained in the second instruction and the zoom viewing operation command contained in the first instruction are different from each other, and they are used to identify different commands and different processing manners.

Step 202: Receive the position coordinates of the second network element object and position coordinates of each third network element object from the back-end server of the network management system.

The position coordinates of the second network element object are obtained by the back-end server of the network management system from the network element object information according to the identifier of the second network element object. The position coordinates of the third network element object are obtained by the back-end server of the network management system from the network element object information according to the identifier of the third network element object, where the identifier of the third network element object is obtained from pre-stored connection object information according to the connection relationship viewing operation command and the identifier of the second network element object.

The connection object information includes identifiers of network element objects at two ends of each connection in the 3D topology view. Therefore, the back-end server of the network management system can obtain the identifiers of all third network element objects according to the identifier of the second network element object.

After sending the second instruction to the back-end server of the network management system, the front-end client of the network management system receives the position coordinates of the second network element object and position coordinates of each third network element object that are returned by the back-end server of the network management system.

Step 203: According to the size of the window, the position coordinates of the second network element object, and the position coordinates of each third network element object, recalculate position coordinates of each third network element object, so that each third network element object can be displayed in the window.

To display all third network element objects along with the second network element object in the window, the front-end client of the network management system recalculates position coordinates of each third network element object according to the size of the window after obtaining position coordinates of each third network element object. A basis for a processing device to recalculate the position coordinates of the third network element object is that the third network element object can be displayed in the window when being displayed by using the recalculated position coordinates, where the used calculation method is not limited.

Step 204: Display the second network element object and each third network element object in the window according to the recalculated position coordinates of each third network element object and the position coordinates of the second network element.

After the position coordinates of each third network element object are recalculated, the front-end client of the network management system displays the second network element object and each third network element object simultaneously in the window according to the recalculated position coordinates of each third network element object and the position coordinates of the second network element object, that is, simultaneously displays the second network element object and all network element objects connected to the second network element object.

In the embodiment, when a user needs to view a connection relationship of a network element object, the user only needs to perform an operation of viewing the connection relationship of the network element object. In response to the user's operation of viewing the connection relationship of the network element object, the front-end client of the network management system generates a second instruction, sends the second instruction to the back-end server of the network management system to obtain the position coordinates of the network element object and other network element objects connected to the network element object from the back-end server of the network management system, and recalculates the position coordinates of other network element objects according to the size of the window. In this way, both the network element object and other network element objects connected to the network element object can be displayed in the window, the user can view a connection of a network element object quickly and clearly, which is free from the restriction of a subnet, so as to solve the problem that network element objects which are in different subnets and connected with each other are invisible in the prior art.

Further, according to the position coordinates of a third network element object, the front-end client of the network management system in the embodiment may determine whether the third network element object is displayed in the window, that is, determine whether position coordinates of a third network element object fall within the window. If the determination result is "no," the front-end client of the network management system performs the operation of recalculating position coordinates of each third network element object according to the size of the window, the position coordinates of the second network element object, and position coordinates of each third network element object, so that each third network element object can be displayed in the window. Preferably, if the determination result is "yes," the front-end client of the network management system does not need to recalculate the position coordinates of the third network element object, which, however, shall not constitute a limitation. For example, even if the third network element object is already displayed in the window, the front-end client of the network management system may still recalculate the position coordinates of the third network element object.

Because the front-end client of the network management system determines whether the position coordinates of the third network element object already fall within the window, and does not recalculate the position coordinates of the third network element object until the determination result is "no," the burden of the processing device is reduced, and operation and maintenance personnel or the user can view the connection relationship of the second network element object more efficiently.

The embodiment provides an implementation manner of "the front-end client of the network management system recalculates position coordinates of each third network element object according to the size of the window, the position coordinates of the second network element object, and the position coordinates of each third network element object so that each third network element object can be displayed in the window," that is, an implementation manner of step 203. The implementation manner includes the following: the front-end client of the network management system calculates a distance between the second network element object and the third network element object according to the position coordinates of the second network element object and the position coordinates of the third network element object. Afterward, the front-end client of the network management system shortens the distance between the second network element object and the third network element object according to the size of the window until the third network element object falls within the window. Subsequently, the front-end client of the network management system recalculates the position coordinates of the third network element object according to a scale of shortening the distance between the second network element object and the third network element object. The scale of shortening the distance between the second network element object and the third network element object may be derived from a ratio of a distance before the shortening to a distance after the shortening.

For example, the front-end client of the network management system may calculate a difference between different coordinates according to the position coordinates of the second network element object and the position coordinates of the third network element object, reduce the calculated difference between different coordinates by the scale of shortening the distance, and then add the reduced coordinate difference to each of the position coordinates of the second network element object to obtain new position coordinates of the third network element object. In addition, the front-end client of the network management system may subtract the corresponding reduced coordinate difference from only a coordinate value representing a horizontal distance in the position coordinates of the second network element object to shorten a distance between the second network element object and the third network element object. The coordinate value representing the horizontal distance between network element objects may be an x-coordinate value, a y-coordinate value, or a z-coordinate value. Taking FIG. 1B as an example, the front-end client of the network management system may shorten the distance between the second network element object and the third network element object by reducing the z-coordinate value of the second network element object and the z-coordinate value of the third network element object.

Further, because the embodiment no longer restricts whether all displayed network element objects that are interconnected belong to the same subnet, information about a subnet to which the third network element object belongs can be displayed when the third network element object and the second network element object belong to different subnets. If the second network element object and the third network element object belong to different subnets, the back-end server of the network management system may, according to the obtained identifier of the third network element object, obtain information about a subnet to which the third network element object belongs from pre-stored network element object information, and transmit the information about the subnet to which the third network element object belongs to the front-end client of the network management system. After receiving the information about the subnet to which the third network element object belongs, the front-end client of the network management system displays the information about the subnet to which the third network element object belongs. Information about a subnet to which each network element object belongs is pre-stored on the back-end server of the network management system as a part of information about the network element object. The embodiment displays the information about the subnet that covers the third network element object whose subnet is different from the subnet of the second network element object, provides auxiliary information for simultaneously displaying network element objects of different subnets in the same window, which helps the user learn connection relationships between network element objects more clearly, and allows the user to determine whether a created SDH path is reasonable.

Further, the embodiment provides an implementation manner of "the front-end client of the network management system displays the second network element object and each third network element object in the window according to the recalculated position coordinates of each third network element object and the position coordinates of the second network element," that is, an implementation manner of step 204. The implementation manner includes the following: the front-end client of the network management system displays each third network element object in the window according to the recalculated position coordinates of each third network element object, displays the second network element object in the window according to the position coordinates of the second network element, and changes a color of a connection line between the second network element object and each third network element object so that the color of the connection line between the second network element object and each third network element object is different from colors of other connection lines in the window. For example, the front-end client of the network management system may uniformly use the color yellow to display all network element objects and connection lines between the network element objects. When the user chooses to view the connection relationship of the second network element object, the front-end client of the network management system may change a color of a connection line between the second network element object and each third network element object to a color in sharp contrast with yellow, such as green and red, so as to highlight the connection relationship of the second network element object and help the user view the connection relationship of the second network element object clearly.

With the implementation manner, not only the second network element object and each third network element object are displayed, but also highlighting is implemented by setting the color of the connection line between the second network element object and each third network element object to be different from the colors of other connection lines, thereby further helping the user conveniently learn the connection relationship of the second network element object.

In the embodiment, in response to the user's operation of viewing a connection relationship of a network element object, the front-end client of the network management system sends an instruction to the back-end server of the network management system to obtain position coordinates of the network element object and other network element objects connected to the network element object, and displays the connection relationship of the network element object in the window simultaneously and highlights a connection line in the connection relationship. Therefore, operation and maintenance personnel or the user can view a connection relationship between the network element objects clearly, it is convenient to perform operations such as fault discovery and troubleshooting based on the connection relationship between the network element objects, so as to improve efficiency of fault discovery and troubleshooting. In addition, the embodiment may further display the network element objects of different subnets in the same window, which allows the operation and maintenance personnel or the user to accurately determine whether a created SDH path is reasonable.

Figure 3:
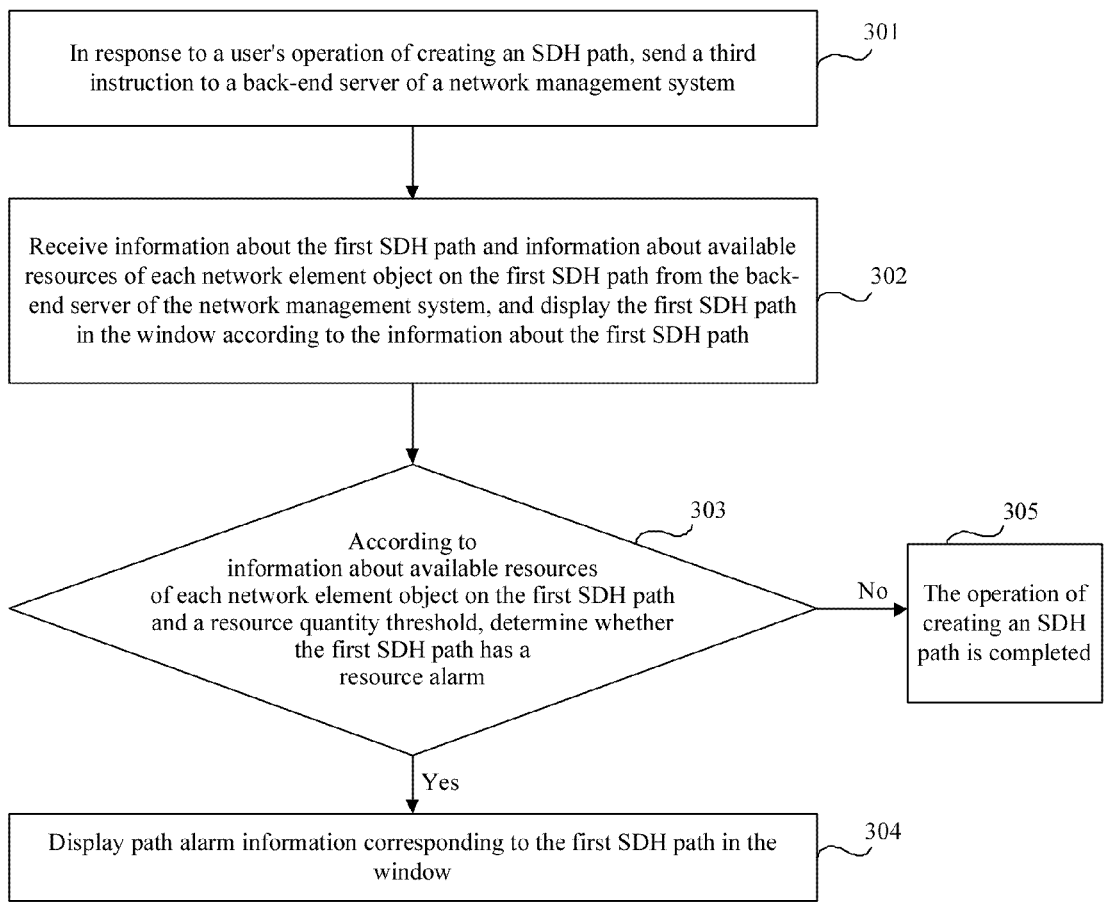
FIG. 3 is a flowchart of a method for processing network element object information in a 3D topology view according to a third embodiment of the present invention.

FIG. 3 is a flowchart of a method for processing network element object information in a 3D topology view according to a third embodiment of the present invention. As shown in FIG. 3, the method in the embodiment includes:

Step 301: In response to a user's operation of creating an SDH path, send a third instruction to a back-end server of a network management system.

The third instruction contains source network element object information, sink network element object information, and specified information; the specified information includes information about network element objects to be traversed and/or not to be traversed by a to-be-created SDH path.

The entity for performing the embodiment is also a front-end client of the network management system, and the front-end client of the network management system collaborates with a back-end server of the network management system.

In the embodiment, the front-end client of the network management system provides the user with a function of creating an SDH path. For example, when the user needs to create an SDH path, the user may perform an operation of creating an SDH path by right-clicking and selecting the function of creating an SDH path. In this case, the front-end client of the network management system in the embodiment may, in response to the user's operation of creating an SDH path, request, through interaction without being limited to interaction, the user to provide the source network element object information, sink network element object information, and specified information that are required for creating the SDH path. For example, the front-end client of the network management system may pop up a message window. Through the message window, the user inputs the source network element object information, the sink network element object information, and the required specified information, and submits the information to the front-end client of the network management system in the embodiment by clicking a Submit button or an OK button in the message window.

Because each network element object generally includes multiple ports, a connection for creating an SDH service between different network element objects is actually a connection between ports that exist between two network element objects. Therefore, the source network element object information in the embodiment mainly includes an identifier of a source network element object and a port located on the source network element object and used for creating an SDH path. Correspondingly, the sink network element object information mainly includes an identifier of a sink network element object and a port located on the sink network element object and used for creating an SDH path. The specified information is optional, that is, the specified information may be included or not. Generally, the specified information is required for creating an SDH path. The specified information may include information about network element objects to be traversed by an SDH path to be created (that is, the network element objects necessarily exist on the SDH path to be created), where the information mainly refers to identifiers, ports, and so on, of the network element objects. The specified information may also include information about network element objects which are not to be traversed by an SDH path to be created (that is, the network element objects do exist on the SDH path to be created), where the information mainly refers to identifiers, ports, and so on, of the network element objects. Moreover, the specified information may include the information about network element objects to be traversed and not to be traversed by an SDH path to be created.

In addition, a port of each network element object to be traversed by the SDH path requires a certain number of resources. Therefore, according to a resource quantity threshold, the front-end client of the network management system may determine whether the SDH path has a resource alarm. The resource quantity threshold may be input by the user or preset on the front-end client of the network management system. The resource quantity threshold is used for determining whether the calculated SDH path has a resource alarm. The resources mainly refer to bandwidth resources. For example, a set resource quantity threshold may be, but not limited to, five virtual containers (VCs) 12. If the number of available resources is less than five VCs 12, resource requirements are not met.

For ease of description and for differentiation from other instructions, that the instruction for creating an SDH path in the embodiment is a third instruction is taken as an example.

After the user initiates an operation of creating an SDH path and provides the required information, the front-end client of the network management system in the embodiment generates a third instruction and sends the third instruction to the back-end server of the network management system.

After receiving the third instruction, the back-end server of the network management system parses the third instruction to obtain source network element object information, sink network element object information, a resource quantity threshold, specified information, and so on, and identifies the need of creating an SDH service relationship between a source network element object and a sink network element object, that is, creating an SDH path, where the SDH path to be created must meet requirements of the specified information. Afterward, according to the source network element object information, the sink network element object information, and the specified information, the back-end server of the network management system uses a set path calculation method to calculate an SDH path from the source network element object to the sink network element object. The SDH path is called a first SDH path. Afterward, the back-end server of the network management system transmits information about the first SDH path and information about available resources of each network element object on the first SDH path to the front-end client of the network management system.

The path calculation method is pre-stored on the back-end server of the network management system. The back-end server of the network management system may pre-store one or more path calculation methods. When there are multiple path calculation methods, the back-end server of the network management system needs to select one of the multiple path calculation methods as a set path calculation method. The path calculation method may be, but is not limited to, a shortest path calculation method. Preferably, if a shortest path calculation method is applied, then, according to the source network element object information, the sink network element object information, and the specified information, the back-end server of the network management system uses the path calculation method to calculate a shortest SDH path from the source network element object to the sink network element object, that is, a first SDH path. The shortest SDH path refers to a path with fewest hops between the source network element object and the sink network element object. The first SDH path meets requirements of the specified information. If the specified information includes information about network element objects to be traversed, the first SDH path necessarily traverses the network element objects required in the specified information; if the specified information includes information about network element objects not to be traversed, the first SDH path does not traverse the network element objects required in the specified information.

The process of calculating the first SDH path by the back-end server of the network management system according to the pre-stored information about each network element object, information in the third instruction, and the applied path calculation method is similar to that in the prior art, and is not repeated herein.

Step 302: Receive information about the first SDH path and information about available resources of each network element object on the first SDH path from the back-end server of the network management system, and display the first SDH path in the window according to the information about the first SDH path.

The first SDH path is the SDH path from the source network element object to the sink network element object, which is calculated by the back-end server of the network management system according to the source network element object information, the sink network element object information, and the specified information by using the set path calculation method.

The front-end client of the network management system receives the information about the first SDH path and the information about available resources of each network element object on the first SDH path from the back-end server of the network management system, and displays the first SDH path in the window according to the information about the first SDH path. The information about the first SDH path mainly includes identifiers of the network element objects making up the first SDH path.

Step 303: According to the information about available resources of each network element object on the first SDH path and the resource quantity threshold, determine whether the first SDH path has a resource alarm; if the determination result is "yes," that is, the first SDH path has a resource alarm, proceed to step 304; otherwise, proceed to step 305.

The resource usage of each network element object on the first SDH path mainly refers to remaining resources of the port of each network element object on the first SDH path. Preferably, the resources are bandwidth resources.

Specifically, the front-end client of the network management system compares the quantity of remaining resources of the port of each network element object on the first SDH path with the resource quantity threshold. If a comparison result shows that the quantity of remaining resources of the port of the network element object is less than the resource quantity threshold, it indicates that the network element object does not meet resource requirements of the first SDH path, and a resource alarm needs to be generated; otherwise, if the quantity of remaining resources of ports of all network element objects is greater than or equal to the resource quantity threshold, no resource alarm needs to be generated.

Step 304: Display path alarm information that corresponds to the first SDH path in the window.

Step 305: The operation of creating an SDH path is completed.

In the embodiment, according to the quantity of remaining resources of the port of each network element object on the first SDH path such as remaining bandwidth resources, the front-end client of the network management system further determines whether the first SDH path has a resource alarm, that is, determines whether the resources of the port of each network element object on the first SDH path meet requirements for performing an SDH service.

If the determination result is "yes," it indicates that the SDH service can be performed successfully based on the first SDH path. In this way, the success rate of performing SDH services is ensured. If the determination result is "no," it indicates that the SDH service cannot be performed successfully based on the first SDH path, and the front-end client of the network management system in the embodiment displays, through a window to the user, the path alarm information that corresponds to the first SDH path. Therefore, the user can adjust the first SDH path in time to provide conditions for performing SDH services successfully.

Figure 4:
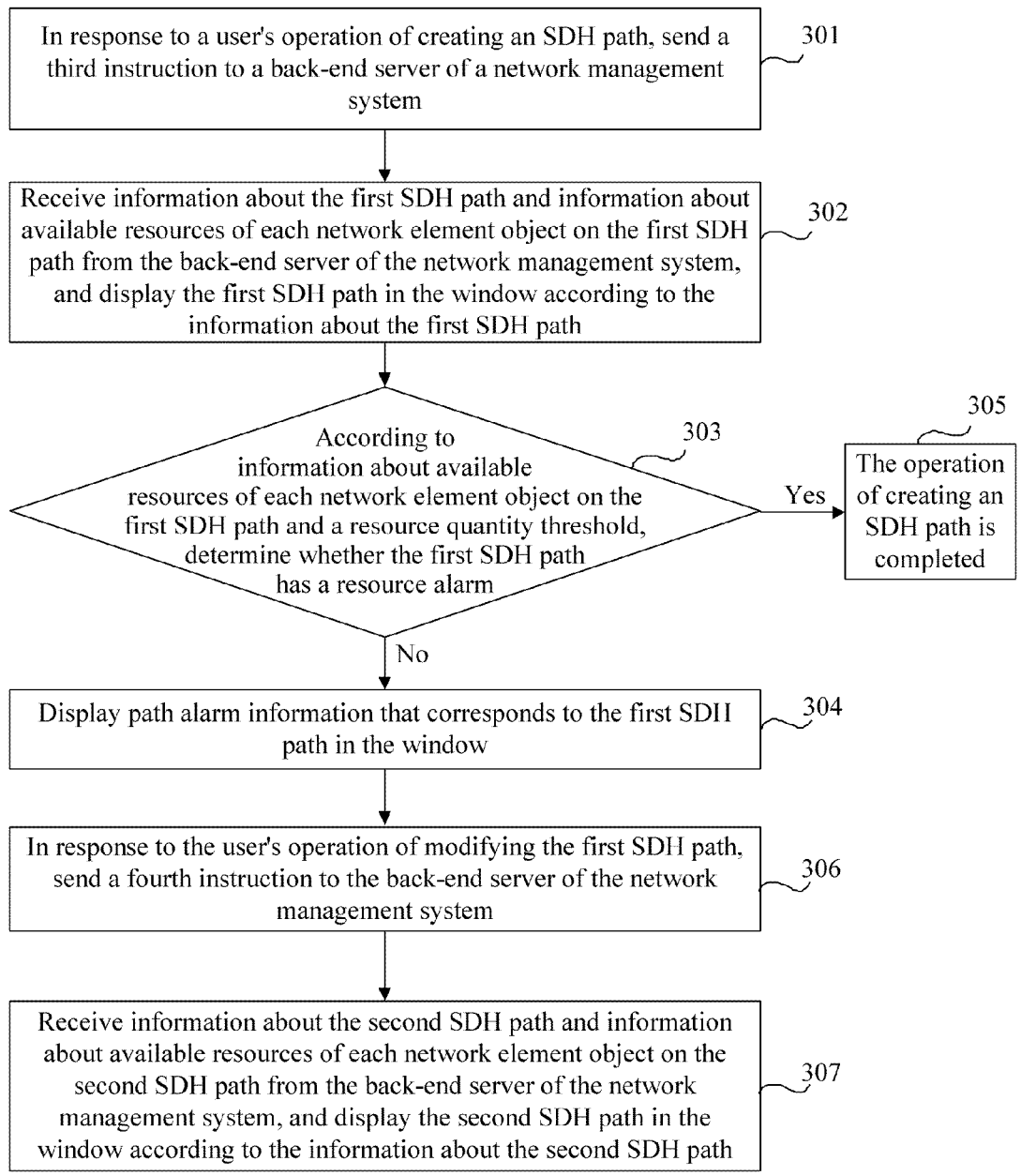
FIG. 4 is a flowchart of a method for processing network element object information in a 3D topology view according to a fourth embodiment of the present invention.

FIG. 4 is a flowchart of a method for processing network element object information in a 3D topology view according to a fourth embodiment of the present invention. This embodiment is implemented based on the embodiment shown in FIG. 3. As shown in FIG. 4, after step 304, the method in this embodiment further includes:

Step 306: In response to the user's operation of modifying the first SDH path, send a fourth instruction to the back-end server of the network management system.

The fourth instruction contains an operation command for modifying the first SDH path.

In the embodiment, the front-end client of the network management system may display the first SDH path on a screen. After the front-end client of the network management system displays the path alarm information, the user may directly initiate an operation of modifying the first SDH path to the front-end client of the network management system. For example, by right-clicking on a specific network element object on the first SDH path and selecting an option of modifying the first SDH path, the user initiates a modification operation to the front-end client of the network management system.

The front-end client of the network management system, in response to the user's modification operation, generates a fourth instruction, sends the fourth instruction to the back-end server of the network management system so that the back-end server of the network management system recalculates an SDH path.

Alternatively, after the front-end client of the network management system displays the path alarm information, the user may initiate an operation of checking resources to the front-end client of the network management system first, check resource usage of the port of each network element object on the first SDH path to further determine whether any network element object with insufficient resources or with not enough resources exists on the first SDH path, and then initiate a modification operation to the front-end client of the network management system to request recalculating the SDH path from the source network element object to the sink network element object.

Step 307: Receive information about the second SDH path and information about available resources of each network element object on the second SDH path from the back-end server of the network management system, and display the second SDH path in the window according to the information about the second SDH path.

The second SDH path is the SDH path from the source network element object to the sink network element object, which is recalculated by the back-end server of the network management system according to the operation command for modifying the first SDH path, the source network element object information, the sink network element object information, and the specified information by using the set path calculation method. The information about the second SDH path mainly includes identifiers of the network element objects making up the second SDH path.

After receiving the fourth instruction, the back-end server of the network management system parses the fourth instruction to obtain the operation command for modifying the first SDH path, and identifies the need of recalculating the SDH path from the source network element object to the sink network element object. Afterward, according to the command, pre-stored information about network element objects, information included in the fourth instruction, and the applied path calculation method, the back-end server of the network management system recalculates an SDH path for the source network element object and the sink network element object.

In the embodiment, when the first SDH path does not meet resource requirements for performing the SDH service, the front-end client of the network management system displays path alarm information so that the user initiates a modification operation, and, by responding to the user's modification operation, the front-end client of the network management system sends a fourth instruction to the back-end server of the network management system so that the back-end server of the network management system recalculates an SDH path, and the SDH service is performed based on the newly created SDH path, thereby improving the success rate of performing SDH services.

Further, after an SDH service or an SDH path is created between two network element objects, the back-end server of the network management system updates the resource usage of the two network element objects and updates a service relationship between two network element ports, so as to facilitate more comprehensive management on information about all network element objects and improve accuracy of the topology view based on the information about the network element objects.

It should be noted that the first network element object, second network element object, and third network element object mentioned in all embodiments described above may be the same network element object or may be different network element objects.

It should be noted that the above embodiments describe an operation of selecting and viewing a network element object, an operation of viewing a connection relationship of a selected network element object, and an operation of creating an SDH path for a selected network element object. The three operations may be performed independently.

Figure 5:
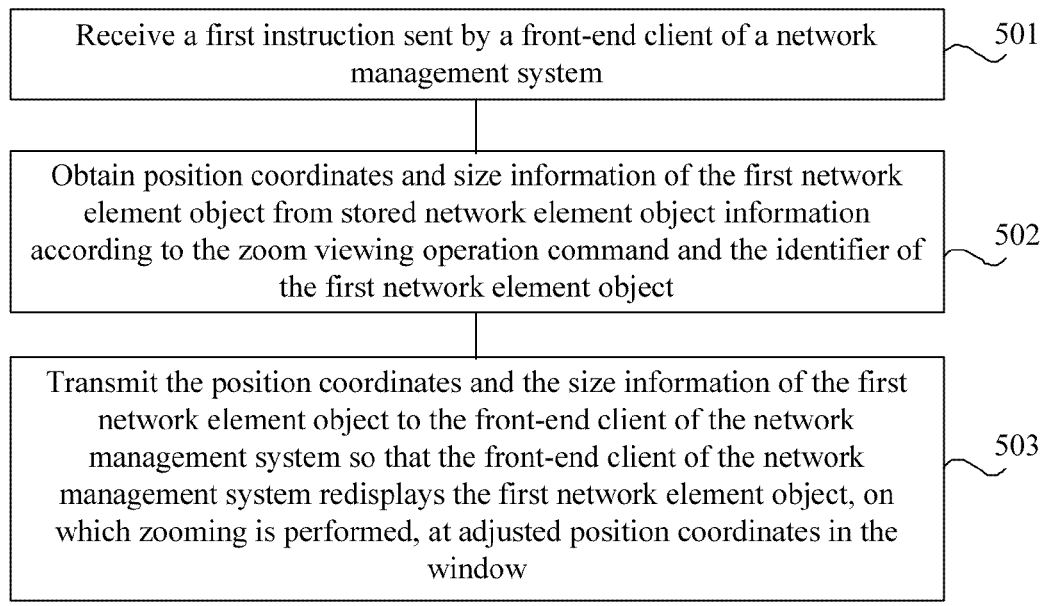
FIG. 5 is a flowchart of a method for processing network element object information in a 3D topology view according to a fifth embodiment of the present invention.

FIG. 5 is a flowchart of a method for processing network element object information in a 3D topology view according to a fifth embodiment of the present invention. As shown in FIG. 5, the method in the embodiment includes:

Step 501: Receive a first instruction sent by a front-end client of a network management system.

The first instruction is generated by the front-end client of the network management system in response to the user's operation of selecting a first network element object in a 3D topology view displayed in a window. The first instruction contains an identifier of the first network element object and a zoom viewing operation command.

The entity for performing the embodiment is a back-end server of the network management system. The back-end server of the network management system collaborates with the front-end client of the network management system.

Regarding how the front-end client of the network management system, in response to the user's operation of selecting a first network element object in a 3D topology view displayed in a window, sends a first instruction to the back-end server of the network management system, reference may be made to the description of the embodiment shown in FIG. 1, and no repeated description is given herein.

The back-end server of the network management system receives the first instruction sent by the front-end client of the network management system.

Step 502: Obtain position coordinates and size information of the first network element object from stored network element object information according to the zoom viewing operation command and the identifier of the first network element object.

The size information of the first network element object includes a length, a width, and a height of the first network element object. The network element object information includes an identifier, position coordinates, and size information of each network element object in the 3D topology view.

In the embodiment, the back-end server of the network management system already pre-stores network element object information and connection object information. For description of the network element object information and the connection object information, reference may be made to the description of the embodiment shown in FIG. 1, and no repeated description is given herein.

Step 503: Transmit the position coordinates and the size information of the first network element object to the front-end client of the network management system so that the front-end client of the network management system redisplays the first network element object, on which zooming is performed, at adjusted position coordinates in the window.

Specifically, after receiving the first instruction, the back-end server of the network management system parses the first instruction to obtain the identifier of the first network element object and the zoom viewing operation command. Afterward, the back-end server of the network management system obtains position coordinates and size information of the first network element object from pre-stored network element object information according to the zoom viewing operation command and the identifier of the first network element object, and transmits the position coordinates and the size information of the first network element object to the front-end client of the network management system.

Further, the network element object information may further include a display status of each network element object in the 3D topology view.

Alternatively, according to the zoom viewing operation command and the display status of each network element object in the network element object information, the back-end server of the network management system may obtain, from the network element object information, position coordinates and size information of each network element object currently displayed in the window of the front-end client of the network management system. Because the first network element object is displayed in the window, it is one of the network element objects currently displayed in the window. That is, the network element objects currently displayed in the window include the first network element object. In this case, according to the identifier information of the first network element object, the back-end server of the network management system may further obtain the position coordinates and the size information of the first network element object from the obtained position coordinates and size information of all the network element objects currently displayed in the window.

Alternatively, the back-end server of the network management system may transmit the position coordinates and the size information of other network element objects currently displayed in the window along with the position coordinates and the size information of the first network element object to the front-end client of the network management system.

Alternatively, the back-end server of the network management system may send the obtained position coordinates and size information of all the network element objects currently displayed in the window to the front-end client of the network management system directly, without the need of obtaining the position coordinates and the size information of the first network element object separately from the information.

Regarding how the front-end client of the network management system redisplays the first network element object, on which zooming is performed, at the adjusted position coordinates in the window, reference may be made to the description of the embodiment shown in FIG. 1.

In the embodiment, the back-end server of the network management system collaborates with the front-end client of the network management system, obtains position coordinates and size information of a first network element object according to a first instruction of the front-end client of the network management system, and provides the obtained information to the front-end client of the network management system, thereby enabling the front-end client of the network management system to adjust a display position of the network element object and zoom the network element object based on the obtained information and the size of the window, to highlight the network element object in the window, and further enabling the user to identify the network element object quickly among many network element objects in the window.

Figure 6:
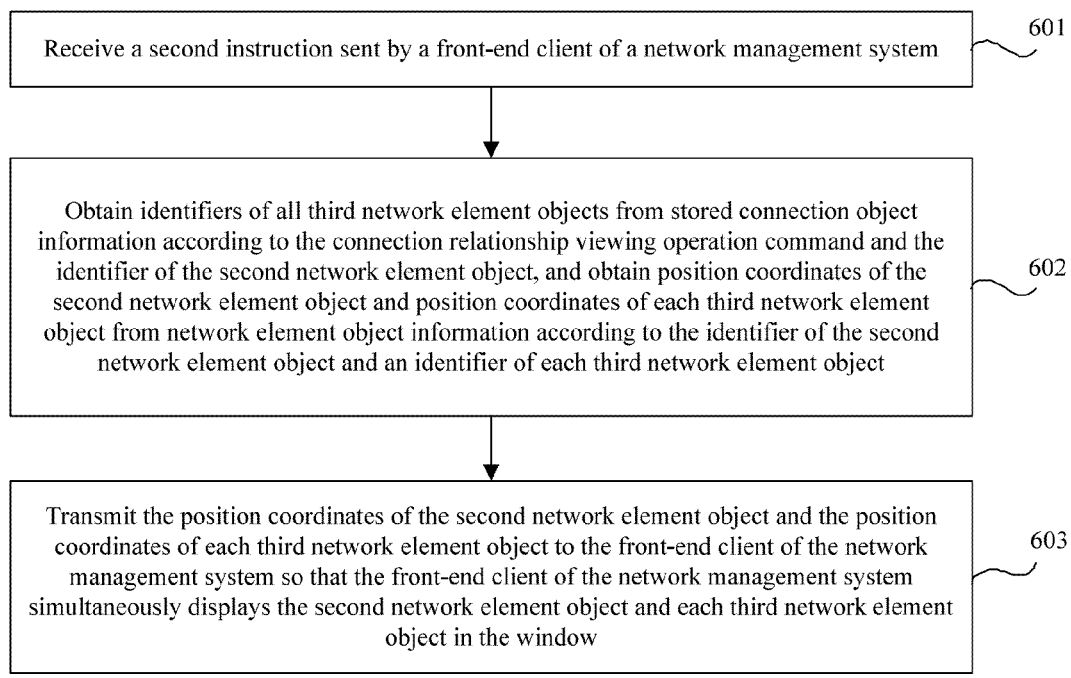
FIG. 6 is a flowchart of a method for processing network element object information in a 3D topology view according to a sixth embodiment of the present invention.

FIG. 6 is a flowchart of a method for processing network element object information in a 3D topology view according to a sixth embodiment of the present invention. As shown in FIG. 6, the method in the embodiment includes:

Step 601: Receive a second instruction sent by a front-end client of a network management system.

The second instruction is generated by the front-end client of the network management system in response to a user's operation of viewing a connection relationship of a second network element object in a 3D topology view displayed in a window. The second instruction contains an identifier of the second network element object and a connection relationship viewing operation command. The connection relationship of the second network element object includes the second network element object and all third network element objects, where the third network element objects are network element objects connected to the second network element object.

The entity for performing the embodiment is a back-end server of the network management system. The back-end server of the network management system collaborates with the front-end client of the network management system.

Regarding how the front-end client of the network management system, in response to the user's operation of viewing a connection relationship of a second network element object in a 3D topology view displayed in a window, sends a second instruction to the back-end server of the network management system, reference may be made to the description of the embodiment shown in FIG. 2, and no repeated description is given herein.

The back-end server of the network management system receives the second instruction sent by the front-end client of the network management system.

Step 602: Obtain identifiers of all third network element objects from stored connection object information according to the connection relationship viewing operation command and the identifier of the second network element object, and obtain position coordinates of the second network element object and position coordinates of each third network element object from network element object information according to the identifier of the second network element object and an identifier of each third network element object.

The connection object information includes identifiers of network element objects at two ends of each connection in the 3D topology view.

Step 603: Transmit the position coordinates of the second network element object and the position coordinates of each third network element object to the front-end client of the network management system so that the front-end client of the network management system simultaneously displays the second network element object and each third network element object in the window.

Regarding how the front-end client of the network management system simultaneously displays the second network element object and each third network element object in the window, reference may be made to the description of the embodiment shown in FIG. 2.

Alternatively, when the third network element object and the second network element object belong to different subnets, the back-end server of the network management system may further obtain information about a subnet to which the third network element object belongs, and transmit the information to the front-end client of the network management system, and therefore, the front-end client of the network management system displays the information about the subnet to which the third network element object belongs when the third network element object and the second network element object belong to different subnets.

In the embodiment, the back-end server of the network management system collaborates with the front-end client of the network management system, obtains position coordinates of a second network element object and position coordinates of each third network element object according to a second instruction of the front-end client of the network management system, and provides the obtained position coordinates to the front-end client of the network management system, thereby enabling the front-end client of the network management system to adjust a display position of the third network element object based on the obtained information and the size of the window and simultaneously display the third network element object and the second network element object in the window, and further enabling the user to view the connection relationship of the network element object.

Figure 7:
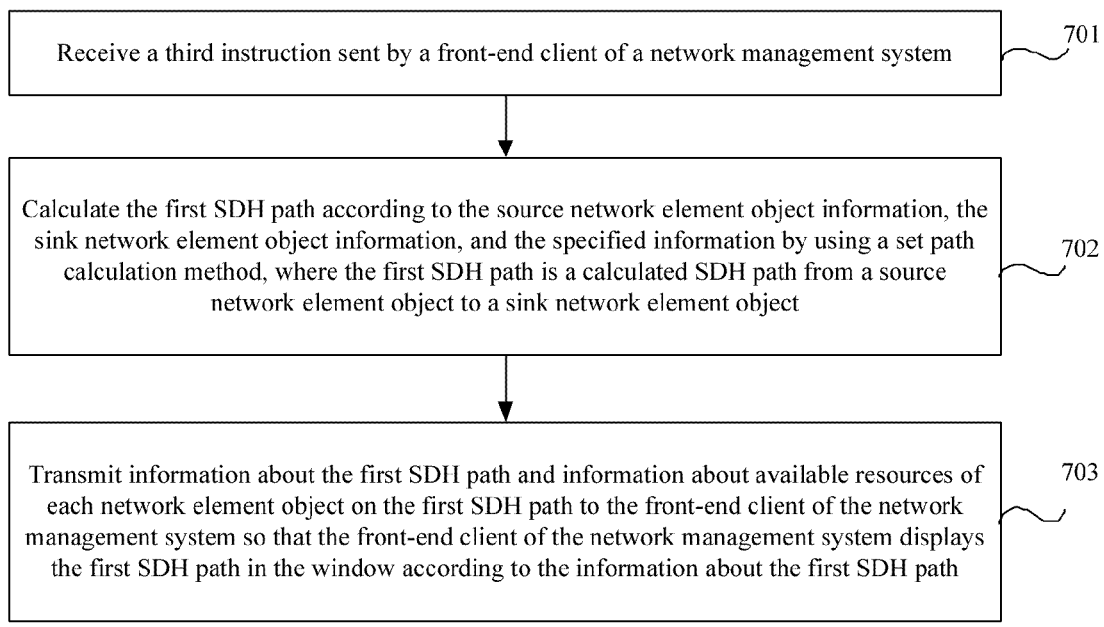
FIG. 7 is a flowchart of a method for processing network element object information in a 3D topology view according to a seventh embodiment of the present invention.

FIG. 7 is a flowchart of a method for processing network element object information in a 3D topology view according to a seventh embodiment of the present invention. As shown in FIG. 7, the method in the embodiment includes:

Step 701: Receive a third instruction sent by a front-end client of a network management system.

The third instruction is generated by the front-end client of the network management system in response to a user's operation of creating an SDH path. The third instruction contains source network element object information, sink network element object information, and specified information. The specified information includes information about network element objects to be traversed and/or not to be traversed by a to-be-created SDH path.

The entity for performing the embodiment is a back-end server of the network management system. The back-end server of the network management system collaborates with the front-end client of the network management system.

Regarding how the front-end client of the network management system, in response to the user's operation of creating an SDH path, sends a third instruction to the back-end server of the a network management system, reference may be made to the description of the embodiment shown in FIG. 3, and no repeated description is given herein.

The back-end server of the network management system receives the third instruction sent by the front-end client of the network management system.

Step 702: Calculate the first SDH path according to the source network element object information, the sink network element object information, and the specified information by using a set path calculation method, where the first SDH path is a calculated SDH path from a source network element object to a sink network element object.

Step 703: Transmit information about the first SDH path and information about available resources of each network element object on the first SDH path to the front-end client of the network management system so that the front-end client of the network management system displays the first SDH path in the window according to the information about the first SDH path.

Specifically, after receiving the third instruction, the back-end server of the network management system parses the third instruction to obtain source network element object information, sink network element object information, a resource quantity threshold, specified information, and so on, and identifies the need of creating an SDH service relationship between a source network element object and a sink network element object, that is, creating an SDH path, where the SDH path to be created must meet requirements of the specified information. Afterward, according to the source network element object information, the sink network element object information, and the specified information, the back-end server of the network management system uses a set path calculation method to calculate an SDH path from the source network element object to the sink network element object. The SDH path is called a first SDH path. Afterward, the back-end server of the network management system transmits information about the first SDH path and information about available resources of each network element object on the first SDH path to the front-end client of the network management system. The information about the first SDH path mainly includes identifiers of the network element objects making up the first SDH path.

The path calculation method is pre-stored on the back-end server of the network management system. The back-end server of the network management system may pre-store one or more path calculation methods. When there are multiple path calculation methods, the back-end server of the network management system selects one of the multiple path calculation methods as a set path calculation method. The path calculation method may be, but is not limited to, a shortest path calculation method. Preferably, if a shortest path calculation method is applied, according to the source network element object information, the sink network element object information, and the specified information, the back-end server of the network management system uses the path calculation method to calculate a shortest SDH path from the source network element object to the sink network element object, that is, a first SDH path. The shortest SDH path refers to a path with fewest hops between the source network element object and the sink network element object. The first SDH path meets requirements of the specified information. If the specified information includes information about network element objects to be traversed, the first SDH path necessarily traverses the network element objects required in the specified information; if the specified information includes information about network element objects not to be traversed, the first SDH path does not traverse the network element objects required in the specified information.

The process of calculating the first SDH path by the back-end server of the network management system according to the pre-stored information about network element objects, information in the third instruction, and the applied path calculation method is similar to that in the prior art, and details are not repeated herein.

In the embodiment, the back-end server of the network management system collaborates with the front-end client of the network management system, creates an SDH path between a source network element object and a sink network element object according to a third instruction of the front-end client of the network management system, and provides information about the created SDH path and information about available resources of each network element object on the SDH path to the front-end client of the network management system so that the front-end client of the network management system can display the SDH path in the window, thereby providing conditions for the user to perform SDH services.

Figure 8:
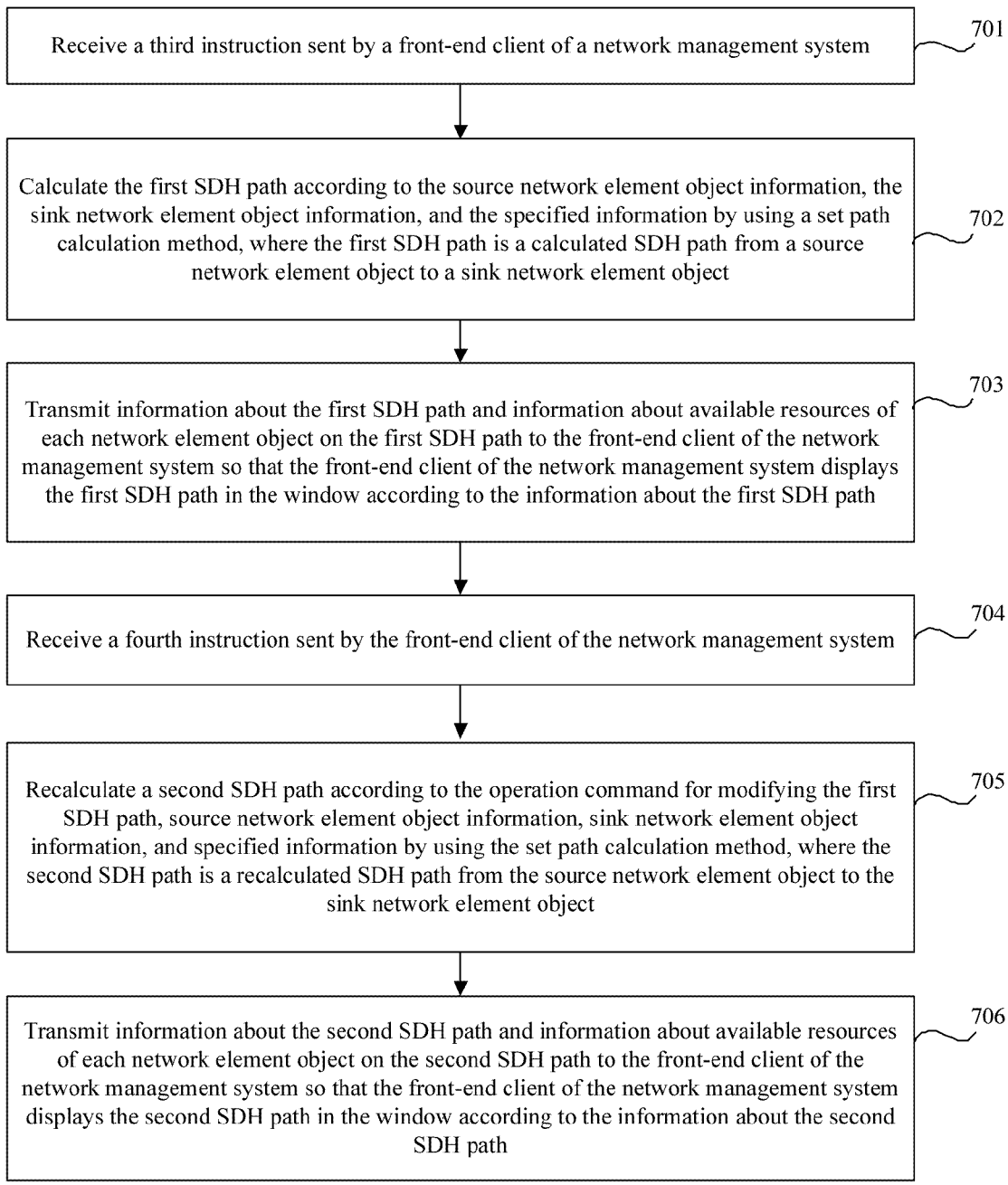
FIG. 8 is a flowchart of a method for processing network element object information in a 3D topology view according to an eighth embodiment of the present invention.

FIG. 8 is a flowchart of a method for processing network element object information in a 3D topology view according to an eighth embodiment of the present invention. This embodiment is implemented based on the embodiment shown in FIG. 7. As shown in FIG. 8, after step 703, the method in the embodiment further includes:

Step 704: Receive a fourth instruction sent by the front-end client of the network management system.

The fourth instruction is generated by the front-end client of the network management system in response to the user's operation of modifying the first SDH path. The fourth instruction contains an operation command for modifying the first SDH path.

Regarding how the front-end client of the network management system, in response to the user's operation of modifying a first SDH path, sends a fourth instruction to the back-end server of the network management system, reference may be made to the description of the embodiment shown in FIG. 4, and no repeated description is given herein.

The back-end server of the network management system receives the fourth instruction sent by the front-end client of the network management system.

Step 705: Recalculate a second SDH path according to the operation command for modifying the first SDH path, source network element object information, sink network element object information, and specified information by using the set path calculation method, where the second SDH path is a recalculated SDH path from the source network element object to the sink network element object.

Step 706: Transmit information about the second SDH path and information about available resources of each network element object on the second SDH path to the front-end client of the network management system so that the front-end client of the network management system displays the second SDH path in the window according to the information about the second SDH path.

Specifically, after receiving the fourth instruction, the back-end server of the network management system parses the fourth instruction to obtain the operation command for modifying the first SDH path, and identifies the need of recalculating the SDH path from the source network element object to the sink network element object. Afterward, according to the command, pre-stored information about network element objects, information included in the fourth instruction, and the applied path calculation method, the back-end server of the network management system recalculates an SDH path for the source network element object and the sink network element object, and transmits information about a recalculated SDH path (that is, a second SDH path) and information about available resources of each network element object on the second SDH path to the front-end client of the network management system. The information about the second SDH path mainly includes identifiers of the network element objects making up the second SDH path.

In the embodiment, the back-end server of the network management system collaborates with the front-end client of the network management system, re-creates an SDH path from a source network element object to a sink network element object according to a fourth instruction of the front-end client of the network management system, and provides information about the re-created SDH path and information about available resources of each network element object on the SDH path to the front-end client of the network management system so that the front-end client of the network management system can display the SDH path in the window, thereby allowing the user to modify the SDH path and providing conditions for the user to perform SDH services correctly.

Figure 9:
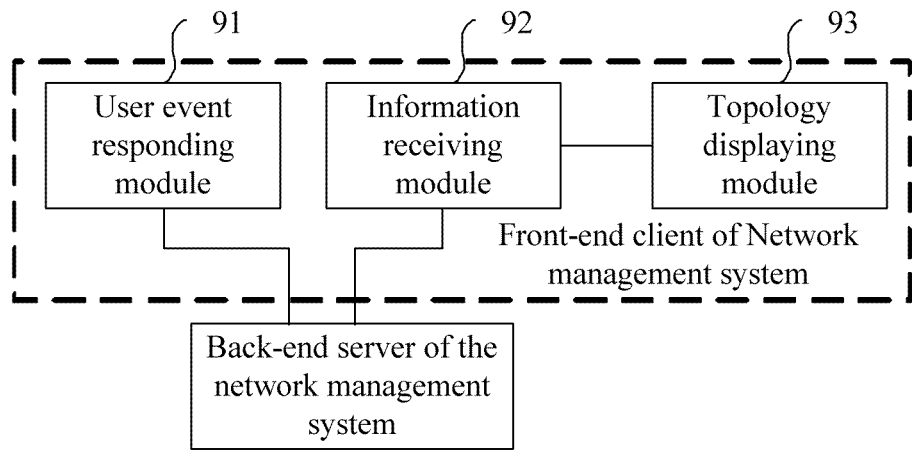
FIG. 9 is a schematic structural diagram of a front-end client of a network management system according to a ninth embodiment of the present invention.

FIG. 9 is a schematic structural diagram of a front-end client of a network management system according to an embodiment of the present invention. As shown in FIG. 9, the front-end client of the network management system in the embodiment includes a user event responding module 91, an information receiving module 92, and a topology displaying module 93.

The user event responding module 91 is connected to a back-end server of the network management system and is configured to, in response to a user's operation of selecting a first network element object in a 3D topology view displayed in a window, send a first instruction to the back-end server of the network management system. The first instruction contains an identifier of the first network element object and a zoom viewing operation command.

The information receiving module 92 is connected to the back-end server of the network management system and is configured to receive the position coordinates and the size information of the first network element object from the back-end server of the network management system. The size information of the first network element object includes a length, a width, and a height of the first network element object; the position coordinates and the size information of the first network element object are obtained by the back-end server of the network management system from stored network element object information according to the zoom viewing operation command and the identifier of the first network element object; and the network element object information includes an identifier, position coordinates, and size information of each network element object in the 3D topology view.

The topology displaying module 93 is connected to the information receiving module 92 and is configured to adjust the position coordinates of the first network element object in the window according to a size of the window and the position coordinates of the first network element object, multiply the size information of the first network element object by a preset zoom factor to zoom the first network element object, and redisplay the zoomed first network element object at the adjusted position coordinates in the window.

Further, the network element object information may further include a display status of each network element object in the 3D topology view. Therefore, the information receiving module 92 is specifically configured to receive position coordinates and size information of all network element objects currently displayed in the window from the back-end server of the network management system. The network element objects currently displayed in the window include the first network element object. The network element objects currently displayed in the window are determined by the back-end server of the network management system according to a display status of each network element object in network element object information.

Further, the topology displaying module 93 may be specifically configured to: calculate, according to the position coordinates of each network element object currently displayed in the window, a distance between the first network element object and network element objects other than the first network element object among all the network element objects currently displayed in the window; recalculate the position coordinates of the first network element object, where the recalculated position coordinates of the first network element object are coordinates that corresponds to a central position of the window, and multiply each of the length, the width, and the height in the size information of the first network element object by the zoom factor; according to the recalculated position coordinates of the first network element object and the distance between the first network element object and network element objects other than the first network element object among all the network element objects currently displayed in the window, recalculate the position coordinates of network element objects other than the first network element object among all the network element objects currently displayed in the window; and according to the recalculated position coordinates of all the network element objects currently displayed in the window, the size information of the first network element object on which zooming is performed, and the received size information of network element objects other than the first network element object among all the network element objects currently displayed in the window, redisplay all the network element objects currently displayed in the window.

Functional modules of the front-end client of the network management system in the embodiment may be configured to implement the method process of processing network element object information in a 3D topology view shown in FIG. 1. Detailed working principles of the modules are not given herein. For details, reference may be made to the description of the method embodiment.

In the embodiment, in response to the user's operation of selecting a network element object, the front-end client of the network management system sends an instruction to the back-end server of the network management system to obtain position coordinates and size information of the network element object from the back-end server of the network management system, and adjusts the display position of the network element object and zooms the network element object according to the obtained information and the size of the window. In this way, the network element object can be highlighted in the window, and the user can identify the network element object quickly among many network element objects in the window.

Further, the user event responding module 91 in the front-end client of the network management system in the embodiment of the present invention is further configured to, in response to the user's operation of viewing a connection relationship of a second network element object in the 3D topology view displayed in the window, send a second instruction to the back-end server of the network management system. The second instruction contains an identifier of the second network element object and a connection relationship viewing operation command; and the connection relationship of the second network element object includes the second network element object and all third network element objects, where the third network element objects are network element objects connected to the second network element object.

Correspondingly, the information receiving module 92 is further configured to receive the position coordinates of the second network element object and position coordinates of each third network element object from the back-end server of the network management system. The position coordinates of the second network element object are obtained by the back-end server of the network management system from the network element object information according to the identifier of the second network element object. The position coordinates of the third network element object are obtained by the back-end server of the network management system from the network element object information according to the identifier of the third network element object, where the identifier of the third network element object is obtained from stored connection object information according to the connection relationship viewing operation command and the identifier of the second network element object. The connection object information includes identifiers of network element objects at two ends of each connection in the 3D topology view.

Correspondingly, the topology displaying module 93 is further configured to: recalculate, according to the size of the window, the position coordinates of the second network element object, and the position coordinates of each third network element object, position coordinates of each third network element object so that each third network element object can be displayed in the window; and display the second network element object and each third network element object in the window according to the recalculated position coordinates of each third network element object and the position coordinates of the second network element.

Further, the topology displaying module 93 may be specifically configured to determine whether position coordinates of each third network element object fall within the window, and, if a determination result is "no," performing the process of recalculating position coordinates of each third network element object according to the size of the window, the position coordinates of the second network element object, and position coordinates of each third network element object so that each third network element object can be displayed in the window.

Further, the topology displaying module 93 may be specifically configured to: calculate, according to the position coordinates of the second network element object and the position coordinates of the third network element object, a distance between the third network element object and the second network element object; shorten the distance between the third network element object and the second network element object according to the size of the window until the third network element object is displayed in the window; and recalculate the position coordinates of the third network element object according to a scale of shortening the distance between the third network element object and the second network element object.

The topology displaying module 93 may be specifically configured to display each third network element object in the window according to the recalculated position coordinates of each third network element object, display the second network element object in the window according to the position coordinates of the second network element, and change a color of a connection line between the second network element object and each third network element object so that the color of the connection line between the second network element object and each third network element object is different from colors of other connection lines in the window.

The topology displaying module 93 is further configured to, when the second network element object and the third network element object belong to different subnets, receive information about a subnet to which the third network element object belongs and display the information about the subnet to which the third network element object belongs, where the information is transmitted by the back-end server of the network management system.

The foregoing functional modules may be configured to implement the method process of processing network element object information in a 3D topology view shown in FIG. 2. Detailed working principles of the modules are not given herein. For details, reference may be made to the description of the method embodiment.

In the embodiment, in response to the user's operation of viewing a connection relationship of a network element object, the front-end client of the network management system generates a second instruction, sends the second instruction to the back-end server of the network management system to obtain position coordinates of the network element object and other network element objects connected to the network element object from the back-end server of the network management system, and recalculates the position coordinates of other network element objects according to the size of the window. In this way, both the network element object and other network element objects connected to the network element object can be displayed in the window, the user can view a connection of a network element object quickly and clearly, which is free from the restriction of a subnet, so as to solve the problem that network element objects which are in different subnets and are connected with each other are invisible in the prior art.

Further, the user event responding module 91 in the embodiment of the present invention is further configured to, in response to the user's operation of creating an SDH path, send a third instruction to the back-end server of the network management system. The third instruction contains source network element object information, sink network element object information, and specified information; the specified information includes information about network element objects to be traversed and/or not to be traversed by a to-be-created SDH path.

The information receiving module 92 is further configured to receive information about the first SDH path and information about available resources of each network element object on the first SDH path from the back-end server of the network management system, and display the first SDH path in the window according to the information about the first SDH path. The first SDH path is the SDH path from the source network element object to the sink network element object, which is calculated by the back-end server of the network management system according to the source network element object information, the sink network element object information, and the specified information by using the set path calculation method.

The topology displaying module 93 is further configured to determine, according to the information about available resources of each network element object on the first SDH path and a resource quantity threshold, whether the first SDH path has a resource alarm, and, if it is determined that the first SDH path has a resource alarm, display path alarm information that corresponds to the first SDH path in the window.

The foregoing functional modules may be configured to implement the method process of processing network element object information in a 3D topology view shown in FIG. 3. Detailed working principles of the modules are not given herein. For details, reference may be made to the description of the method embodiment.

The front-end client of the network management system in the embodiment may further display the path alarm information to the user through a window so that the user can adjust the first SDH path in time to provide conditions for performing SDH services successfully.

Further, the user event responding module 91 in the embodiment of the present invention is further configured to, in response to the user's operation of modifying the first SDH path, send a fourth instruction to the back-end server of the network management system. The fourth instruction contains an operation command for modifying the first SDH path.

The information receiving module 92 is further configured to receive information about a second SDH path and information about available resources of each network element object on the second SDH path from the back-end server of the network management system, and display the second SDH path in the window according to the information about the second SDH path. The second SDH path is the SDH path from the source network element object to the sink network element object, which is recalculated by the back-end server of the network management system according to the operation command for modifying the first SDH path, the source network element object information, the sink network element object information, and the specified information by using the set path calculation method.

The foregoing functional modules may be configured to implement the method process of processing network element object information in a 3D topology view shown in FIG. 4. Detailed working principles of the modules are not given herein. For details, reference may be made to the description of the method embodiment.

The front-end client of the network management system in the embodiment may further display path alarm information when the first SDH path does not meet resource requirements for performing an SDH service, so that the user initiates a modification operation, and, by responding to the user's modification operation, a fourth instruction is send to the back-end server of the network management system so that the back-end server of the network management system recalculates an SDH path, and the SDH service is performed based on the newly created SDH path, thereby improving the success rate of performing SDH services.

Figure 10:
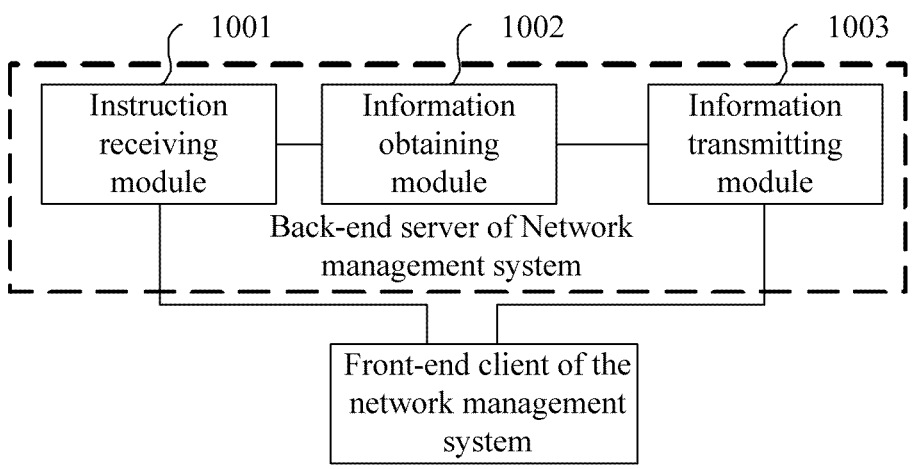
FIG. 10 is a schematic structural diagram of a back-end server of a network management system according to a tenth embodiment of the present invention.

FIG. 10 is a schematic structural diagram of a back-end server of a network management system according to a tenth embodiment of the present invention. As shown in FIG. 10, the back-end server of the network management system in the embodiment includes an instruction receiving module 1001, an information obtaining module 1002, and an information transmitting module 1003.

The instruction receiving module 1001 is connected to a front-end client of the network management system and is configured to receive a first instruction sent by the front-end client of the network management system. The first instruction is generated by the front-end client of the network management system in response to a user's operation of selecting a first network element object in a 3D topology view displayed in a window, and the first instruction contains an identifier of the first network element object and a zoom viewing operation command.

The information obtaining module 1002 is connected to the instruction receiving module 1001 and is configured to obtain position coordinates and size information of the first network element object from stored network element object information according to the zoom viewing operation command and the identifier of the first network element object. The size information of the first network element object includes a length, a width, and a height of the first network element object, and the network element object information includes an identifier, position coordinates, and size information of each network element object in the 3D topology view.

The information transmitting module 1003 is connected to the information obtaining module 1002 and the front-end client of the network management system and is configured to transmit the position coordinates and the size information of the first network element object to the front-end client of the network management system so that the front-end client of the network management system redisplays the first network element object, on which zooming is performed, at adjusted position coordinates in the window.

Further, the network element object information further includes a display status of each network element object in the 3D topology view.

The information obtaining module 1002 in the embodiment may be specifically configured to, according to the zoom viewing operation command and the display status of each network element object in the network element object information, obtain, from the network element object information, position coordinates and size information of each network element object currently displayed in the window. The network element objects currently displayed in the window include the first network element object.

Correspondingly, the information transmitting module 1003 is specifically configured to transmit the position coordinates and size information of all the network element objects currently displayed in the window to the front-end client of the network management system.

Functional modules of the back-end server of the network management system in the embodiment may be configured to implement the method process of processing network element object information in a 3D topology view shown in FIG. 5. Detailed working principles of the modules are not given herein. For details, reference may be made to the description of the method embodiment.

The back-end server of the network management system in the embodiment collaborates with the front-end client of the network management system provided in the embodiment of the present invention, obtains position coordinates and size information of a first network element object according to a first instruction of the front-end client of the network management system, and provides the obtained information to the front-end client of the network management system, thereby enabling the front-end client of the network management system to adjust a display position of the network element object and zoom the network element object based on the obtained information and the size of the window, to highlight the network element object in the window, and further enabling the user to identify the network element object quickly among many network element objects in the window.

Further, the instruction receiving module 1001 of the back-end server of the network management system in the embodiment of the present invention is further configured to receive a second instruction sent by the front-end client of the network management system. The second instruction is generated by the front-end client of the network management system in response to the user's operation of viewing a connection relationship of a second network element object in the 3D topology view displayed in the window. The second instruction contains an identifier of the second network element object and a connection relationship viewing operation command; and the connection relationship of the second network element object includes the second network element object and all third network element objects, where the third network element objects are network element objects connected to the second network element object.

Correspondingly, the information obtaining module 1002 is further configured to: obtain identifiers of all third network element objects from pre-stored connection object information according to the connection relationship viewing operation command and the identifier of the second network element object, and obtain position coordinates of the second network element object and position coordinates of each third network element object from network element object information according to the identifier of the second network element object and an identifier of each third network element object. The connection object information includes identifiers of network element objects at two ends of each connection in the 3D topology view.

Correspondingly, the information transmitting module 1003 is further configured to transmit the position coordinates of the second network element object and the position coordinates of each third network element object to the front-end client of the network management system so that the front-end client of the network management system simultaneously displays the second network element object and each third network element object in the window.

The foregoing functional modules may be configured to implement the method process of processing network element object information in a 3D topology view shown in FIG. 6. Detailed working principles of the modules are not given herein. For details, reference may be made to the description of the method embodiment.

The back-end server of the network management system in the embodiment collaborates with the front-end client of the network management system provided in the embodiment of the present invention, obtains position coordinates of a second network element object and position coordinates of each third network element object according to a second instruction of the front-end client of the network management system, and provides the obtained position coordinates for the front-end client of the network management system, thereby enabling the front-end client of the network management system to adjust a display position of the third network element object based on the obtained information and the size of the window and simultaneously display the third network element object and the second network element object in the window, and further enabling the user to view the connection relationship of the network element object.

Further, the instruction receiving module 1001 in the embodiment of the present invention is further configured to receive a third instruction sent by the front-end client of the network management system. The third instruction is generated by the front-end client of the network management system in response to the user's operation of creating a synchronous digital hierarchy SDH path. The third instruction contains source network element object information, sink network element object information, and specified information; the specified information includes information about network element objects to be traversed and/or not to be traversed by a to-be-created SDH path.

Correspondingly, the information obtaining module 1002 is further configured to calculate a first SDH path according to the source network element object information, the sink network element object information, and the specified information by using a set path calculation method, where the first SDH path is a calculated SDH path from a source network element object to a sink network element object.

Correspondingly, the information transmitting module 1003 is further configured to transmit information about the first SDH path and information about available resources of each network element object on the first SDH path to the front-end client of the network management system so that the front-end client of the network management system displays the first SDH path in the window according to the information about the first SDH path.

The foregoing functional modules may be configured to implement the method process of processing network element object information in a 3D topology view shown in FIG. 7. Detailed working principles of the modules are not given herein. For details, reference may be made to the description of the method embodiment.

The back-end server of the network management system in the embodiment collaborates with the front-end client of the network management system provided in the embodiment of the present invention, creates an SDH path from a source network element object to a sink network element object according to a third instruction of the front-end client of the network management system, and provides information about the created SDH path and information about available resources of each network element object on the SDH path to the front-end client of the network management system so that the front-end client of the network management system can display the SDH path in the window, thereby providing conditions for the user to perform SDH services.

Further, the instruction receiving module 1001 in the embodiment of the present invention is further configured to receive a fourth instruction sent by the front-end client of the network management system. The fourth instruction is generated by the front-end client of the network management system in response to the user's operation of modifying the first SDH path. The fourth instruction contains an operation command for modifying the first SDH path.

Correspondingly, the information obtaining module 1002 is further configured to recalculate a second SDH path according to the operation command for modifying the first SDH path, source network element object information, sink network element object information, and specified information by using the set path calculation method, where the second SDH path is a recalculated SDH path from a source network element object to a sink network element object, so that the front-end client of the network management system displays the second SDH path in the window according to information about the second SDH path.

Correspondingly, the information transmitting module 1003 is further configured to transmit the information about the second SDH path and the information about available resources of each network element object on the second SDH path to the front-end client of the network management system.

The foregoing functional modules may be configured to implement the method process of processing network element object information in a 3D topology view shown in FIG. 8. Detailed working principles of the modules are not given herein. For details, reference may be made to the description of the method embodiment.

The back-end server of the network management system in the embodiment collaborates with the front-end client of the network management system provided in the embodiment of the present invention, re-creates an SDH path from a source network element object to a sink network element object according to a fourth instruction of the front-end client of the network management system, and provides information about the re-created SDH path and information about available resources of each network element object on the SDH path to the front-end client of the network management system so that the front-end client of the network management system can display the SDH path in the window, thereby allowing the user to modify the SDH path and providing conditions for the user to perform SDH services correctly.

Figure 11:
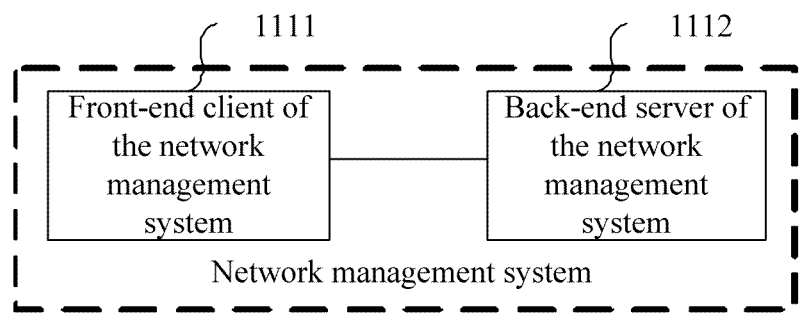
FIG. 11 is a schematic structural diagram of a network management system according to an eleventh embodiment of the present invention.

FIG. 11 is a schematic structural diagram of a network management system according to an eleventh embodiment of the present invention. As shown in FIG. 11, the system in the embodiment includes a front-end client of the network management system 1111 and a back-end server of the network management system 1112, where the front-end client of the network management system 1111 is connected to the back-end server of the network management system 1112.

The front-end client of the network management system 1111 is configured to, in response to a user's operation of selecting a first network element object in a 3D topology view displayed in a window, send a first instruction to the back-end server of the network management system 1112. The first instruction contains an identifier of the first network element object and a zoom viewing operation command.

The back-end server of the network management system 1112 is configured to obtain position coordinates and size information of the first network element object from stored network element object information according to the zoom viewing operation command and the identifier of the first network element object, and transmit the position coordinates and the size information of the first network element object to the front-end client of the network management system 1111. The network element object information includes an identifier, position coordinates, and size information of each network element object in the 3D topology view.

The front-end client of the network management system 1111 is further configured to adjust the position coordinates of the first network element object in the window according to a size of the window and the position coordinates of the first network element object, multiply the size information of the first network element object by a preset zoom factor to zoom the first network element object, and redisplay the zoomed first network element object at the adjusted position coordinates in the window.

For the structure of the front-end client of the network management system 1111 in the embodiment, reference may be made to FIG. 9; for its working principles, reference may be made to the process for processing network element object information in a 3D topology view shown in FIG. 1, and no repeated description is given herein.

For the structure of the back-end server of the network management system 1112 in the embodiment, reference may be made to FIG. 10; for its working principles, reference may be made to the process for processing network element object information in a 3D topology view shown in FIG. 5, and no repeated description is given herein.

With the network management system in the embodiment, the back-end server of the network management system collaborates with the front-end client of the network management system; the front-end client of the network management system, in response to a user's operation of viewing a network element object, sends a first instruction to the back-end server of the network management system; according to the first instruction of the front-end client of the network management system, the back-end server of the network management system obtains position coordinates and size information of a first network element object and provides the obtained information to the front-end client of the network management system; the front-end client of the network management system adjusts a display position of the network element object and zooms the network element object based on the received information about the first network element object and the size of the window, to highlight the network element object in the window, thereby further enabling the user to identify the network element object quickly among many network element objects in the window.

Further, the front-end client of the network management system 1111 provided in the embodiment of the present invention is further configured to, in response to the user's operation of viewing a connection relationship of a second network element object in the 3D topology view displayed in the window, send a second instruction to the back-end server of the network management system 1112. The second instruction contains an identifier of the second network element object and a connection relationship viewing operation command; and the connection relationship of the second network element object includes the second network element object and all third network element objects, where the third network element objects are network element objects connected to the second network element object.

The back-end server of the network management system 1112 is further configured to obtain identifiers of all third network element objects from stored connection object information according to the connection relationship viewing operation command and the identifier of the second network element object, obtain position coordinates of the second network element object and position coordinates of each third network element object from network element object information according to the identifier of the second network element object and an identifier of each third network element object, and transmit the position coordinates of the second network element object and the position coordinates of each third network element object to the front-end client of the network management system 1111. The connection object information includes identifiers of network element objects at two ends of each connection in the 3D topology view.

The front-end client of the network management system 1111 is further configured to: recalculate, according to the size of the window, the position coordinates of the second network element object, and the position coordinates of each third network element object, position coordinates of each third network element object so that each third network element object can be displayed in the window; and display the second network element object and each third network element object in the window according to the recalculated position coordinates of each third network element object and the position coordinates of the second network element.

With the network management system in the embodiment, the back-end server of the network management system collaborates with the front-end client of the network management system; in response to the user's operation of viewing a connection relationship of a second network element object, the front-end client of the network management system sends a second instruction to the back-end server of the network management system; according to the second instruction, the back-end server of the network management system obtains position coordinates of the second network element object and position coordinates of each third network element object connected to the second network element object, and provides the obtained position coordinates for the front-end client of the network management system; the front-end client of the network management system recalculates position coordinates of the third network element object according to the received information and the size of the window so as to display the second network element object and all third network element objects in the window simultaneously. Therefore, operation and maintenance personnel or the user can view the connection relationship between all network element objects clearly, it is convenient to perform operations such as fault discovery and troubleshooting based on the connection relationship between the network element objects, so as to improve efficiency of fault discovery and troubleshooting.

The front-end client of the network management system 1111 provided in the embodiment of the present invention is further configured to, in response to the user's operation of creating a SDH path, send a third instruction to the back-end server of the network management system 1112. The third instruction contains source network element object information, sink network element object information, and specified information; the specified information includes information about network element objects to be traversed and/or not to be traversed by a to-be-created SDH path.

The back-end server of the network management system 1112 is further configured to calculate a first SDH path according to the source network element object information, the sink network element object information, and the specified information by using a set path calculation method, and transmit information about the first SDH path and information about available resources of each network element object on the first SDH path to the front-end client of the network management system 1111, where the first SDH path is a calculated SDH path from a source network element object to a sink network element object.

The front-end client of the network management system 1111 is further configured to: receive the information about the first SDH path and the information about available resources of each network element object on the first SDH path from the back-end server of the network management system, and display the first SDH path in the window according to the information about the first SDH path; according to the information about available resources of each network element object on the first SDH path and a resource quantity threshold, determine whether the first SDH path has a resource alarm, and, if it is determined that the first SDH path has a resource alarm, display path alarm information that corresponds to the first SDH path in the window.

With the network management system in the embodiment, the back-end server of the network management system collaborates with the front-end client of the network management system; in response to the user's operation of creating an SDH path, the front-end client of the network management system sends a third instruction to the back-end server of the network management system; the back-end server of the network management system creates an SDH path from a source network element object to a sink network element object according to the third instruction, and provides information about the created SDH path and information about available resources of each network element object on the SDH path to the front-end client of the network management system; the front-end client of the network management system displays path alarm information to the user through a window, thereby allowing the user to adjust the first SDH path in time and providing conditions for performing SDH services successfully.

Further, the front-end client of the network management system 1111 provided in the embodiment of the present invention is further configured to, in response to the user's operation of modifying the first SDH path, send a fourth instruction to the back-end server of the network management system 1112. The fourth instruction contains an operation command for modifying the first SDH path.

The back-end server of the network management system 1112 is further configured to recalculate a second SDH path according to the operation command for modifying the first SDH path, the source network element object information, the sink network element object information, and the specified information by using the set path calculation method, and transmit information about the second SDH path and information about available resources of each network element object on the second SDH path to the front-end client of the network management system 1111, where the second SDH path is a recalculated SDH path from a source network element object to a sink network element object.

The front-end client of the network management system 1111 is further configured to receive the information about the second SDH path and the information about available resources of each network element object on the second SDH path from the back-end server of the network management system 1112, and display the second SDH path in the window according to the information about the second SDH path.

With the network management system in the embodiment, the back-end server of the network management system collaborates with the front-end client of the network management system; in response to the user's operation of modifying an SDH path, the front-end client of the network management system sends a fourth instruction to the back-end server of the network management system; the back-end server of the network management system recalculates the SDH path from a source network element object to a sink network element object according to the fourth instruction, and provides information about a recalculated SDH path and information about available resources of each network element object on the SDH path to the front-end client of the network management system, thereby enabling the user to perform an SDH service based on the newly created SDH path and improving the success rate of performing SDH services.

Persons of ordinary skill in the art may understand that all or part of the steps in each of the foregoing method embodiments may be implemented by a program instructing relevant hardware. The program may be stored in a computer readable storage medium. When the program is run, the steps of the foregoing methods in the embodiments are performed. The storage medium includes any medium that is capable of storing program codes, such as a read-only memory (ROM), a random-access memory (RAM), a magnetic disk, or an optical disk.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they can still make modifications to the technical solutions described in the foregoing embodiments, or make equivalent replacements to some or all the technical features thereof, without departing from the idea and scope of the technical solutions of the embodiments of the present invention.

What is claimed is:

1. A method for processing network element object information in a three-dimensional (3D) topology view comprising:

sending a first instruction to a back-end server of a network management system in response to a user's operation of selecting a first network object in the 3D topology view displayed in a window, wherein the first instruction contains an identifier of the first network element object and a zoom viewing operation command;

receiving position coordinates and size information of the first network element object from the back-end server of the network management system, wherein the size information of the first network element object comprises a length, a width, and a height of the first network element object, wherein the position coordinates and the size information of the first network element object are obtained by the back-end server of the network management system from stored network element object information according to the zoom viewing operation command and the identifier of the first network element object, and wherein the network element object information comprises an identifier, position coordinates, and size information of each network element object in the 3D topology view; and adjusting position coordinates of the first network element object in the window according to a size of the window and the position coordinates of the first network element object, multiplying the size information of the first network element object by a preset zoom factor to zoom the first network element object, and redisplaying the zoomed first network element object at the adjusted position coordinates in the window, wherein the network element object information further comprises a display status of each network element object in the 3D topology view, wherein receiving the position coordinates and the size information of the first network element object from the back-end server of the network management system comprises receiving position coordinates and size information of all network element objects currently displayed in the window from the back-end server of the network management system, wherein all the network element objects currently displayed in the window are determined by the back-end server of the network management system according to the display status of each network element object in the network element object information, wherein all the network element objects currently displayed in the window comprise the first network element object, and wherein adjusting the position coordinates of the first network element object in the window according to the size of the window and the position coordinates of the first network element object, multiplying the size information of the first network element object by the preset zoom factor to zoom the first network element object, and redisplaying the zoomed first network element object at the adjusted position coordinates in the window comprise:

calculating, according to the position coordinates of all the network element objects currently displayed in the window, a distance between the first network element object and network element objects other than the first network element object among all the network element objects currently displayed in the window;

recalculating position coordinates of the first network element object, wherein the recalculated position coordinates of the first network element object are coordinates that correspond to a central position of the window, and multiplying each of the length, the width, and the height in the size information of the first network element object by the zoom factor;

recalculating, according to the recalculated position coordinates of the first network element object and the distance between the first network element object and the network element objects other than the first network element object among all the network element objects currently displayed in the window, position coordinates of the network element objects other than the first network element object among all the network element objects currently displayed in the window; and redisplaying all the network objects currently displayed in the window according to the recalculated position coordinates of all the network element objects currently displayed in the window, the size information of the first network element object on which zooming is performed, and received size information of the network element objects other than the first network element object among all the network element objects currently displayed in the window.

2. A method for processing network element object information in a three-dimensional (3D) topology view comprising:

sending a first instruction to a back-end server of a network management system in response to a user's operation of selecting a first network object in the 3D topology view displayed in a window, wherein the first instruction contains an identifier of the first network element object and a zoom viewing operation command;

receiving position coordinates and size information of the first network element object from the back-end server of the network management system, wherein the size information of the first network element object comprises a length, a width, and a height of the first network element object, wherein the position coordinates and the size information of the first network element object are obtained by the back-end server of the network management system from stored network element object information according to the zoom viewing operation command and the identifier of the first network element object, and wherein the network element object information comprises an identifier, position coordinates, and size information of each network element object in the 3D topology view;

adjusting position coordinates of the first network element object in the window according to a size of the window and the position coordinates of the first network element object, multiplying the size information of the first network element object by a preset zoom factor to zoom the first network element object, and redisplaying the zoomed first network element object at the adjusted position coordinates in the window;

sending a second instruction to the back-end server of the network management system in response to the user's operation of viewing a connection relationship of a second network element object in the 3D topology view displayed in the window, wherein the second instruction contains an identifier of the second network element object and a connection relationship viewing operation command, wherein the connection relationship of the second network element object comprises the second network element object and all third network element objects, and wherein the third network element objects are network element objects which are connected to the second network element object;

receiving position coordinates of the second network element object and position coordinates of each third network element object from the back-end server of the network management system, wherein the position coordinates of the second network element object are obtained by the back-end server of the network management system from the network element object information according to the identifier of the second network element object, wherein the position coordinates of the each third network element object are obtained by the back-end server of the network management system from the network element object information according to an identifier of the each third network element object, wherein the identifier of the each third network element object is obtained from stored connection object information according to the connection relationship viewing operation command and the identifier of the second network element object, and wherein the connection object information comprises identifiers of network element objects at two ends of each connection in the 3D topology view;

recalculating, according to the size of the window, the position coordinates of the second network element object, and the position coordinates of the each third network element object, position coordinates of the each third network element object such that the each third network element object can be displayed in the window; and displaying the second network element object and the each third network element object in the window according to the recalculated position coordinates of the each third network element object and the position coordinates of the second network element element.

3. The method for processing network element object information in the 3D topology view according to claim 2, wherein recalculating, according to the size of the window, the position coordinates of the second network element object, and the position coordinates of the each third network element object, position coordinates of the each third network element object such that the each third network element object can be displayed in the window comprises:
  determining whether position coordinates of the each third network element object fall within the window;
  performing the process of recalculating, according to the size of the window, the position coordinates of the second network element object, and the position coordinates of the each third network element object, the position coordinates of the each third network element object such that the each third network element object can be displayed in the window when it is determined that the position coordinates of the each third network element object do not fall within the window.

4. The method for processing network element object information in the 3D topology view according to claim 3, wherein recalculating, according to the size of the window, the position coordinates of the second network element object, and the position coordinates of the each third network element object, the position coordinates of the each third network element object such that the each third network element object can be displayed in the window comprises:
  calculating a distance between the each third network element object and the second network element object according to the position coordinates of the second network element object and the position coordinates of the each third network element object;
  shortening the distance between the each third network element object and the second network element object according to the size of the window until the each third network element object is displayed in the window; and
  recalculating position coordinates of the each third network element object according to a scale of shortening the distance between the each third network element object and the second network element object.

5. The method for processing network element object information in the 3D topology view according to claim 2, further comprising:
  receiving information about a subnet to which the each third network element object belongs; and
  displaying the information about the subnet to which the each third network element object belongs, wherein the information is transmitted by the back-end server of the network management system when the second network element object and the each third network element object belong to different subnets.

6. The method for processing network element object information in the 3D topology view according to claim 2, wherein displaying the second network element object and the each third network element object in the window according to the recalculated position coordinates of the each third network element object and the position coordinates of the second network element comprises:
  displaying the each third network element object in the window according to the recalculated position coordinates of the each third network element object;
  displaying the second network element object in the window according to the position coordinates of the second network element; and
  changing a color of a connection line between the second network element object and the each third network element object such that the color of the connection line between the second network element object and the each third network element object is different from colors of other connection lines in the window.

7. A method for processing network element object information in a three-dimensional (3D) topology view comprising:
  sending a first instruction to a back-end server of a network management system in response to a user's operation of selecting a first network object in the 3D topology view displayed in a window, wherein the first instruction contains an identifier of the first network element object and a zoom viewing operation command;
  receiving position coordinates and size information of the first network element object from the back-end server of the network management system, wherein the size information of the first network element object comprises a length, a width, and a height of the first network element object, wherein the position coordinates and the size information of the first network element object are obtained by the back-end server of the network management system from stored network element object information according to the zoom viewing operation command and the identifier of the first network element object, and wherein the network element object information comprises an identifier, position coordinates, and size information of each network element object in the 3D topology view;
  adjusting position coordinates of the first network element object in the window according to a size of the window and the position coordinates of the first network element object, multiplying the size information of the first network element object by a preset zoom factor to zoom the first network element object, and redisplaying the zoomed first network element object at the adjusted position coordinates in the window;
  sending a third instruction to the back-end server of the network management system in response to the user's operation of creating a synchronous digital hierarchy (SHD) path, wherein the third instruction contains source network element object information, sink network element object information, and specified information, and wherein the specified information comprises information about network element objects to be traversed and/or not to be traversed by a to-be-created SDH path;
  receiving information about a first SDH path and information about available resources of each network element object on the first SDH path from the back-end server of the network management system;
  displaying the first SDH path in the window according to the information about the first SDH path, wherein the first SDH path is an SDH path from a source network element object to a sink network element object, which is calculated by the back-end server of the network management system according to the source network element object information, the sink network element object information, and the specified information by using a set path calculation method;
  determining, according to the information about available resources of each network element object on the first SDH path and a resource quantity threshold, whether the first SDH path has a resource alarm; and
  displaying path alarm information that corresponds to the first SDH path in the window when it is determined that the first SDH path has a resource alarm.

8. The method for processing network element object information in the 3D topology view according to claim 7, further comprising:

sending a fourth instruction to the back-end server of the network management system in response to the user's operation of modifying the first SDH path, wherein the fourth instruction contains an operation command for modifying the first SDH path;

receiving information about a second SDH path and information about available resources of each network element object on the second SDH path from the back-end server of the network management system; and displaying the second SDH path in the window according to the information about the second SDH path, wherein the second SDH path is an SDH path from the source network element object to the sink network element object, which is recalculated by the back-end server of the network management system according to the operation command for modifying the first SDH path, the source network element object information, the sink network element object information, and the specified information by using the set path calculation method.

9. A method for processing network element object information in a three-dimensional (3D) topology view comprising:

receiving a first instruction sent by a front-end client of a network management system, wherein the first instruction is generated by the front-end client of the network management system in response to a user's operation of selecting a first network element object in a 3D topology view displayed in a window, and wherein the first instruction contains an identifier of the first network element object and a zoom viewing operation command;

obtaining position coordinates and size information of the first network element object from stored network element object information according to the zoom viewing operation command and the identifier of the first network element object, wherein the size information of the first network element object comprises a length, a width, and a height of the first network element object, and wherein the network element object information comprises an identifier, position coordinates, and size information of each network element object in the 3D topology view;

transmitting the position coordinates and the size information of the first network element object to the front-end client of the network management system such that the front-end client of the network management system redisplays the first network element object, on which zooming is performed, at adjusted position coordinates in the window;

receiving a second instruction sent by the front-end client of the network management system, wherein the second instruction is generated by the front-end client of the network management system in response to the user's operation of viewing a connection relationship of a second network element object in the 3D topology view displayed in the window, wherein the second instruction contains an identifier of the second network element object and a connection relationship viewing operation command, wherein the connection relationship of the second network element object comprises the second network element object and all third network element objects, and wherein the third network element objects are network element objects connected to the second network element object;

obtaining identifiers of all the third network element objects from stored connection object information according to the connection relationship viewing operation command and the identifier of the second network element object;

obtaining position coordinates of the second network element object and position coordinates of each third network element object from the network element object information according to the identifier of the second network element object and an identifier of the each third network element object, wherein the connection object information comprises identifiers of network element objects at two ends of each connection in the 3D topology view; and transmitting the position coordinates of the second network element object and the position coordinates of the each third network element object to the front-end client of the network management system such that the front-end client of the network management system simultaneously displays the second network element object and the each third network element object in the window.

10. A method for processing network element object information in a three-dimensional (3D) topology view comprising:

receiving a first instruction sent by a front-end client of a network management system, wherein the first instruction is generated by the front-end client of the network management system in response to a user's operation of selecting a first network element object in a 3D topology view displayed in a window, and wherein the first instruction contains an identifier of the first network element object and a zoom viewing operation command;

obtaining position coordinates and size information of the first network element object from stored network element object information according to the zoom viewing operation command and the identifier of the first network element object, wherein the size information of the first network element object comprises a length, a width, and a height of the first network element object, and wherein the network element object information comprises an identifier, position coordinates, and size information of each network element object in the 3D topology view;

transmitting the position coordinates and the size information of the first network element object to the front-end client of the network management system such that the front-end client of the network management system redisplays the first network element object, on which zooming is performed, at adjusted position coordinates in the window;

receiving a third instruction sent by the front-end client of the network management system, wherein the third instruction is generated by the front-end client of the network management system in response to the user's operation of creating a synchronous digital hierarchy (SDH) path, wherein the third instruction contains source network element object information, sink network element object information, and specified information, and wherein the specified information comprises information about network element objects to be traversed and/or not to be traversed by a to-be-created SDH path;

calculating a first SDH path according to the source network element object information, the sink network element object information, and the specified information by using a set path calculation method, wherein the first SDH path is a calculated SDH path from a source network element object to a sink network element object; and transmitting information about the first SDH path and information about available resources of each network element object on the first SDH path to the front-end client of the network management system such that the front-end client of the network management system displays the first SDH path in the window according to the information about the first SDH path.

11. The method for processing network element object information in the 3D topology view according to claim 10, further comprising:

receiving a fourth instruction sent by the front-end client of the network management system, wherein the fourth instruction is generated by the front-end client of the network management system in response to the user's operation of modifying the first SDH path, and wherein the fourth instruction contains an operation command for modifying the first SDH path;

recalculating a second SDH path according to the operation command for modifying the first SDH path, the source network element object information, the sink network element object information, and the specified information by using the set path calculation method, wherein the second SDH path is a recalculated SDH path from the source network element object to the sink network element object; and transmitting information about the second SDH path and information about available resources of each network element object on the second SDH path to the front-end client of the network management system such that the front-end client of the network management system displays the second SDH path in the window according to the information about the second SDH path.

12. A front-end client of a network management system comprising:

a user event responding module configured to, in response to a user's operation of selecting a first network element object in a three-dimensional (3D) topology view displayed in a window, send a first instruction to a back-end server of the network management system, wherein the first instruction contains an identifier of the first network element object and a zoom viewing operation command;

an information receiving module configured to receive position coordinates and size information of the first network element object from the back-end server of the network management system, wherein the size information of the first network element object comprises a length, a width, and a height of the first network element object, wherein the position coordinates and the size information of the first network element object are obtained by the back-end server of the network management system from stored network element object information according to the zoom viewing operation command and the identifier of the first network element object, and wherein the network element object information comprises an identifier, position coordinates, and size information of each network element object in the 3D topology view; and a topology displaying module including a processor and configured to adjust position coordinates of the first network element object in the window according to a size of the window and the position coordinates of the first network element object, multiply the size information of the first network element object by a preset zoom factor to zoom the first network element object, and redisplay the zoomed first network element object at the adjusted position coordinates in the window, wherein the network element object information further comprises a display status of each network element object in the 3D topology view, wherein the information receiving module is specifically configured to receive position coordinates and size information of all network element objects currently displayed in the window from the back-end server of the network management system, wherein all the network element objects currently displayed in the window are determined by the back-end server of the network management system according to the status of each network element object in the network element object information, wherein all the network element objects currently displayed in the window comprise the first network element object, and wherein the topology displaying module is specifically configured to:

calculate, according to the position coordinates of all the network element objects currently displayed in the window, a distance between the first network element object and network element objects other than the first network element object among all the network element objects currently displayed in the window;

recalculate position coordinates of the first network element object, wherein the recalculated position coordinates of the first network element object are coordinates that corresponds to a central position of the window, and m the width, and the height in the size information of the first network element object by the zoom factor;

recalculate according to the recalculated position coordinates of the first network element object and the distance between the first network element object and the network element objects other than the first network element object among all the network element objects currently played in the window, position coordinates of network element objects other than the first network element object among all the network element objects currently displayed in the window; and redisplay all the network element objects currently displayed in the window according to the recalculated position coordinates of all the network element objects currently displayed in the window, the size information of the first network element object on which zooming is performed, and received size information of the network element objects other than the first network element object among all the network element objects currently displayed in the window.

13. A front-end client of a network management system comprising:

a user event responding module configured to, in response to a user's operation of selecting a first network element object in a three-dimensional (3D) topology view displayed in a window, send a first instruction to a back-end server of the network management system, wherein the first instruction contains an identifier of the first network element object and a zoom viewing operation command;

an information receiving module configured to receive position coordinates and size information of the first network element object from the back-end server of the network management system, wherein the size information of the first network element object comprises a length, a width, and a height of the first network element object, wherein the position coordinates and the size information of the first network element object are obtained by the back-end server of the network management system from stored network element object information according to the zoom viewing operation command and the identifier of the first network element object, and wherein the network element object information comprises an identifier, position coordinates, and size information of each network element object in the 3D topology view; and a topology displaying module including a processor and configured to adjust position coordinates of the first network element object in the window according to a size of the window and the position coordinates of the first network element object, multiply the size information of the first network element object by a preset zoom factor to zoom the first network element object, and redisplay the zoomed first network element object at the adjusted position coordinates in the window, wherein the user event responding module is further configured to, in response to the user's operation of viewing a connection relationship of a second network element object in the 3D topology view displayed in the window, send a second instruction to the back-end server of the network management system, wherein the second instruction contains an identifier of the second network element object and a connection relationship viewing operation command, wherein the connection relationship of the second network element object comprises the second network element object and all third network element objects, wherein the third network element objects are network element objects which are connected to the second network element object, wherein the information receiving module is further configured to receive position coordinates of the second network element object and position coordinates of each third network element object from the back-end server of the network management system, wherein the position coordinates of the second network element object are obtained by the back-end server of the network management system from the network element object information according to the identifier of the second network element object, wherein the position coordinates of the each third network element object are obtained by the back-end server of the network management system from the network element object information according to an identifier of the each third network element object, wherein the identifier of the each third network element object is obtained from stored connection object information according to the connection relationship viewing operation command and the identifier of the second network element object, wherein the connection object information comprises identifiers of network element objects at two ends of each connection in the 3D topology view, wherein the topology displaying module is further configured to recalculate, according to the size of the window, the position coordinates of the second network element object, and the position coordinates of the each third network element object, position coordinates of the each third network element object such that the each third network element object can be displayed in the window, and wherein the topology displaying module is further configured to display the second network element object and the each third network element object in the window according to the recalculated position coordinates of the each third network element object and the position coordinates of the second network element.

14. The front-end client of the network management system according to claim 13, wherein the topology displaying module is specifically configured to:

determine whether position coordinates of the each third network element object fall within the window; and performing the process of recalculating position coordinates of the each third network element object according to the size of the window, the position coordinates of the second network element object, and the position coordinates of the each third network element object such that the each third network element object can be displayed in the window when it is determined that the position coordinates of the each third network element object do not fall within the window.

15. The front-end client of the network management system according to claim 14, wherein the topology displaying module is specifically configured to:

calculate, according to the position coordinates of the second network element object and the position coordinates of the each third network element object, a distance between the each third network element object and the second network element object;

shorten the distance between the each third network element object and the second network element object according to the size of the window until the each third network element object is displayed in the window; and recalculate position coordinates of the each third network element object according to a scale of shortening the distance between the each third network element object and the second network element object.

16. The front-end client of the network management system according to claim 13, wherein the topology displaying module is further configured to receive information about a subnet to which the each third network element object belongs and display the information about the subnet to which the each third network element object belongs, and wherein the information is transmitted by the back-end server of the network management system when the second network element object and the each third network element object belong to different subnets.

17. The front-end client of the network management system according to claim 13, wherein the topology displaying module is specifically configured to display the each third network element object in the window according to the recalculated position coordinates of the each third network element object, display the second network element object in the window according to the position coordinates of the second network element, and change a color of a connection line between the second network element object and the each third network element object such that the color of the connection line between the second network element object and the each third network element object is different from colors of other connection lines in the window.

18. A front-end client of a network management system comprising:

a user event responding module configured to, in response to a user's operation of selecting a first network element object in a three-dimensional (3D) topology view displayed in a window, send a first instruction to a back-end server of the network management system, wherein the first instruction contains an identifier of the first network element object and a zoom viewing operation command;

an information receiving module configured to receive position coordinates and size information of the first network element object from the back-end server of the network management system, wherein the size information of the first network element object comprises a length, a width, and a height of the first network element object, wherein the position coordinates and the size information of the first network element object are obtained by the back-end server of the network management system from stored network element object information according to the zoom viewing operation command and the identifier of the first network element object, and wherein the network element object information comprises an identifier, position coordinates, and size information of each network element object in the 3D topology view; and a topology displaying module including a processor and configured to adjust position coordinates of the first network element object in the window according to a size of the window and the position coordinates of the first network element object, multiply the size information of the first network element object by a preset zoom factor to zoom the first network element object, and redisplay the zoomed first network element object at the adjusted position coordinates in the window, wherein the user event responding module is further configured to, in response to the user's operation of creating a synchronous digital hierarchy (SDH) path, send a third instruction to the back-end server of the network management system, wherein the third instruction contains source network element object information, sink network element object information, and specified information, wherein the specified information comprises information about network element objects to be traversed and/or not to be traversed by a to-be-created SDH path, wherein the information receiving module is further configured to receive information about a first SDH path and information about available resources of each network element object on the first SDH path from the back-end server of the network management system, and display the first SDH path in the window according to the information about the first SDH path, wherein the first SDH path is an SDH path from a source network element object to a sink network element object, which is calculated by the back-end server of the network management system according to the source network element object information, the sink network element object information, and the specified information by using a set path calculation method, and wherein the topology displaying module is further configured to determine, according to the information about available resources of each network element object on the first SDH path and a resource quantity threshold, whether the first SDH path has a resource alarm, and, when it is determined that the first SDH path has a resource alarm, display path alarm information that corresponds to the first SDH path in the window.

19. The front-end client of the network management system according to claim 18, wherein the user event responding module is further configured to, in response to the user's operation of modifying the first SDH path, send a fourth instruction to the back-end server of the network management system, wherein the fourth instruction contains an operation command for modifying the first SDH path, wherein the information receiving module is further configured to receive information about a second SDH path and information about available resources of each network element object on the second SDH path from the back-end server of the network management system, and display the second SDH path in the window according to the information about the second SDH path, and wherein the second SDH path is an SDH path from the source network element object to the sink network element object, which is recalculated by the back-end server of the network management system according to the operation command for modifying the first SDH path, the source network element object information, the sink network element object information, and the specified information by using the set path calculation method.

20. A back-end server of a network management system comprising:

an instruction receiving module configured to receive a first instruction sent by a front-end client of the network management system, wherein the first instruction is generated by the front-end client of the network management system in response to a user's operation of selecting a first network element object in a three-dimensional (3D) topology view displayed in a window, and wherein the first instruction contains an identifier of the first network element object and a zoom viewing operation command;

an information obtaining module configured to obtain position coordinates and size information of the first network element object from stored network element object information according to the zoom viewing operation command and the identifier of the first network element object, wherein the size information of the first network element object comprises a length, a width, and a height of the first network element object, and wherein the network element object information comprises an identifier, position coordinates, and size information of each network element object in the 3D topology view; and an information transmitting module configured to transmit the position coordinates and the size information of the first network element object to the front-end client of the network management system such that the front-end client of the network management system redisplays the first network element object, on which zooming is performed, at adjusted position coordinates in the window, wherein the instruction receiving module is further configured to receive a second instruction sent by the front-end client of the network management system, wherein the second instruction is generated by the front-end client of the network management system in response to the user's operation of viewing a connection relationship of a second network element object in the 3D topology view displayed in the window, wherein the second instruction contains an identifier of the second network element object and a connection relationship viewing operation command, wherein the connection relationship of the second network element object comprises the second network element object and all third network element objects, wherein the third network element objects are network element objects connected to the second network element object, wherein the information obtaining module is further configured to obtain identifiers of all the third network element objects from stored connection object information according to the connection relationship viewing operation command and the identifier of the second network element object, and obtain position coordinates of the second network element object and position coordinates of each third network element object from the network element object information according to the identifier of the second network element object and an identifier of the each third network element object, wherein the connection object information comprises identifiers of network element objects at two ends of each connection in the 3D topology view, and wherein the information transmitting module is further configured to transmit the position coordinates of the second network element object and the position coordinates of the each third network element object to the front-end client of the network management system such that the front-end client of the network management system simultaneously displays the second network element object and the each third network element object in the window.

21. A back-end server of a network management system comprising:

an instruction receiving module configured to receive a first instruction sent by a front-end client of the network management system, wherein the first instruction is generated by the front-end client of the network management system in response to a user's operation of selecting a first network element object in a three-dimensional (3D) topology view displayed in a window, and wherein the first instruction contains an identifier of the first network element object and a zoom viewing operation command;

an information obtaining module configured to obtain position coordinates and size information of the first network element object from stored network element object information according to the zoom viewing operation command and the identifier of the first network element object, wherein the size information of the first network element object comprises a length, a width, and a height of the first network element object, and wherein the network element object information comprises an identifier, position coordinates and size information of each network element object in the 3D topology view; and an information transmitting module configured to transmit the position coordinates and the size information of the first network element object to the front-end client of the network management system such that the front-end client of the network management system redisplays the first network element object, on which zooming is performed, at adjusted position coordinates in the window, wherein the instruction receiving module is further configured to receive a third instruction sent by the front-end client of the network management system, wherein the third instruction is generated by the front-end client of the network management system in response to the user's operation of creating a synchronous digital hierarchy (SDH) path, wherein the third instruction contains source network element object information, sink network element object information, and specified information, wherein the specified information comprises information about network element objects to be traversed and/or not to be traversed by a to-be-created SDH path, wherein the information obtaining module is further configured to calculate a first SDH path according to the source network element object information, the sink network element object information, and the specified information by using a set path calculation method, wherein the first SDH path is a calculated SDH path from a source network element object to a sink network element object, and wherein the information transmitting module is further configured to transmit information about the first SDH path and information about available resources of each network element object on the first SDH path to the front-end client of the network management system such that the front-end client of the network management system displays the first SDH path in the window according to the information about the first SDH path.

22. The back-end server of the network management system according to claim 21, wherein the instruction receiving module is further configured to receive a fourth instruction sent by the front-end client of the network management system, wherein the fourth instruction is generated by the front-end client of the network management system in response to the user's operation of modifying the first SDH path, wherein the fourth instruction contains an operation command for modifying the first SDH path, wherein the information obtaining module is further configured to recalculate a second SDH path according to the operation command for modifying the first SDH path, the source network element object information, the sink network element object information, and the specified information by using the set path calculation method, wherein the second SDH path is a recalculated SDH path from the source network element object to the sink network element object, and wherein the information transmitting module is further configured to transmit information about the second SDH path and information about available resources of each network element object on the second SDH path to the front-end client of the network management system such that the front-end client of the network management system displays the second SDH path in the window according to the information about the second SDH path.

* * * * *